(12) United States Patent
Fox

(10) Patent No.: US 11,099,836 B2
(45) Date of Patent: *Aug. 24, 2021

(54) SELF-HEALING LEARNING SYSTEM FOR ONE OR MORE CONTROLLERS

(71) Applicant: Aurora Labs Ltd., Tel Aviv (IL)

(72) Inventor: Zohar Fox, Tel Aviv (IL)

(73) Assignee: Aurora Labs Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/096,413

(22) Filed: Nov. 12, 2020

(65) Prior Publication Data

US 2021/0064359 A1 Mar. 4, 2021

Related U.S. Application Data

(63) Continuation of application No. 16/921,999, filed on Jul. 7, 2020, now Pat. No. 10,866,853, which is a (Continued)

(51) Int. Cl.
*G06F 9/445* (2018.01)
*G06F 8/658* (2018.01)
(Continued)

(52) U.S. Cl.
CPC ............ *G06F 8/658* (2018.02); *B60W 50/02* (2013.01); *B60W 50/0205* (2013.01);
(Continued)

(58) Field of Classification Search
CPC ..... G06F 8/60; G06F 8/65; G06F 8/70; G06F 8/71; G06F 8/654; G06F 8/656;
(Continued)

(56) References Cited

U.S. PATENT DOCUMENTS

| 5,442,553 A | 8/1995 | Parrillo |
| 7,366,589 B2 | 4/2008 | Habermas |

(Continued)

OTHER PUBLICATIONS

Haibo Chen et al., Dynamic Software Updating Using a Relaxed Consistency Model, IEEE, 2011, retrieved online on Apr. 22, 2021, pp. 679-694. Retrieved from the Internet: <URL: https://ieeexplore.IEEE.org/stamp/stamp.jsp?tp=&arnumber=5551162>. (Year: 2011).*

(Continued)

*Primary Examiner* — Hanh Thi-Minh Bui
(74) *Attorney, Agent, or Firm* — Finnegan, Henderson, Farabow, Garrett & Dunner, LLP

(57) ABSTRACT

Disclosed embodiments relate to automatically providing updates to at least one vehicle. Operations may include receiving, at a server remote from the at least one vehicle, Electronic Control Unit (ECU) activity data from the at least one vehicle, the ECU activity data corresponding to actual operation of the ECU in the at least one vehicle; determining, at the server and based on the ECU activity data, a software vulnerability affecting the at least one vehicle, the software vulnerability being determined based on a deviation between the received ECU activity data and expected ECU activity data; identifying, at the server, an ECU software update based on the determined software vulnerability; and sending, from the server, a delta file configured to update software on the ECU with a software update corresponding to the identified ECU software update.

18 Claims, 20 Drawing Sheets

Related U.S. Application Data continuation of application No. 16/857,547, filed on Apr. 24, 2020, now Pat. No. 10,747,604, which is a continuation of application No. 16/751,872, filed on Jan. 24, 2020, now Pat. No. 10,678,627, which is a continuation of application No. 16/594,206, filed on Oct. 7, 2019, now Pat. No. 10,585,661, which is a continuation of application No. 16/458,360, filed on Jul. 1, 2019, now Pat. No. 10,481,899, which is a continuation of application No. 16/360,653, filed on Mar. 21, 2019, now Pat. No. 10,416,989, which is a continuation of application No. 16/044,454, filed on Jul. 24, 2018, now Pat. No. 10,303,460.

(60) Provisional application No. 62/536,767, filed on Jul. 25, 2017, provisional application No. 62/560,224, filed on Sep. 19, 2017.

(51) Int. Cl.

| | | |
|---|---|---|
| B60W 50/04 | (2006.01) | |
| B60W 50/02 | (2012.01) | |
| G06F 21/57 | (2013.01) | |
| G06F 11/14 | (2006.01) | |
| G06F 12/02 | (2006.01) | |
| G06F 8/656 | (2018.01) | |
| G06F 8/654 | (2018.01) | |
| G06F 16/188 | (2019.01) | |
| G06F 9/4401 | (2018.01) | |
| G06F 12/06 | (2006.01) | |
| G06F 8/65 | (2018.01) | |
| G06F 8/71 | (2018.01) | |
| G06F 11/07 | (2006.01) | |
| G06F 11/36 | (2006.01) | |
| G06F 8/60 | (2018.01) | |
| G06F 11/16 | (2006.01) | |
| G06N 20/00 | (2019.01) | |

(52) U.S. Cl.
CPC ........ *B60W 50/0225* (2013.01); *B60W 50/04* (2013.01); *B60W 50/045* (2013.01); *G06F 8/60* (2013.01); *G06F 8/65* (2013.01); *G06F 8/654* (2018.02); *G06F 8/656* (2018.02); *G06F 8/71* (2013.01); *G06F 9/4401* (2013.01); *G06F 9/445* (2013.01); *G06F 9/44521* (2013.01); *G06F 11/079* (2013.01); *G06F 11/0721* (2013.01); *G06F 11/0751* (2013.01); *G06F 11/0793* (2013.01); *G06F 11/1433* (2013.01); *G06F 11/1629* (2013.01); *G06F 11/3612* (2013.01); *G06F 12/0284* (2013.01); *G06F 12/0646* (2013.01); *G06F 16/188* (2019.01); *G06F 21/57* (2013.01); *G06F 21/572* (2013.01); *G06F 21/577* (2013.01); *B60W 2050/021* (2013.01); *G06F 8/66* (2013.01); *G06F 2212/1008* (2013.01); *G06F 2212/1044* (2013.01); *G06F 2212/1056* (2013.01); *G06F 2221/033* (2013.01); *G06N 20/00* (2019.01)

(58) Field of Classification Search
CPC ........ G06F 8/658; G06F 9/445; G06F 9/4401; G06F 9/44521; G06F 11/79; G06F 11/70721; G06F 11/70751; G06F 11/70793; G06F 11/71433; G06F 11/71629; G06F 11/73612; G06F 11/0284; G06F 21/57; G06F 21/577; G06F 21/0646; B60W 50/02; B60W 50/0205; B60W 50/04; B60W 50/045

See application file for complete search history.

(56) References Cited

U.S. PATENT DOCUMENTS

| | | | |
|---|---|---|---|
| 7,702,876 | B2 | 4/2010 | Brockmann |
| 8,190,322 | B2 | 5/2012 | Lin et al. |
| 8,397,301 | B2 | 3/2013 | Hering et al. |
| 8,484,752 | B2 | 7/2013 | Traenkenschuh |
| 8,595,413 | B2 | 11/2013 | Shima et al. |
| 8,745,746 | B1 | 6/2014 | Jain |
| 8,813,061 | B2 | 8/2014 | Hoffman |
| 9,443,358 | B2 | 9/2016 | Breed |
| 9,443,359 | B2 | 9/2016 | Sarkar |
| 2004/0133887 | A1 | 7/2004 | Herle et al. |
| 2009/0113386 | A1 | 4/2009 | Eker et al. |
| 2010/0077131 | A1* | 3/2010 | Lam ............... G06F 12/0246 711/103 |
| 2012/0277949 | A1 | 11/2012 | Ghimire |
| 2013/0061216 | A1 | 3/2013 | Adler et al. |
| 2014/0222282 | A1 | 8/2014 | Paul |
| 2016/0321311 | A1 | 11/2016 | Tallamraju et al. |
| 2016/0370076 | A1 | 12/2016 | Yang |
| 2016/0371077 | A1 | 12/2016 | Moeller et al. |
| 2017/0060559 | A1 | 3/2017 | Ye et al. |
| 2017/0177631 | A1 | 6/2017 | Page et al. |
| 2017/0242678 | A1* | 8/2017 | Sangameswaran ....... G06F 8/65 |
| 2017/0255459 | A1* | 9/2017 | Tanimoto ................. G06F 8/65 |
| 2018/0285086 | A1 | 10/2018 | O'Malley et al. |
| 2019/0079755 | A1 | 3/2019 | Jones et al. |
| 2019/0114162 | A1 | 4/2019 | Izumi |

OTHER PUBLICATIONS

Y.V. Pant et al., "AUTOPLUG: An Architecture for Remote Electronic Controller Unit Diagnostics in Automotive Systems", Jan. 2012, 15 pgs., posted at Scholarly Commons, http://reository.upenn.edu/mlab_papers/49.

Jong-Chan Kim et al., HW Resource Componentizing for Smooth Migration from Single-function ECU to Multi-function ECU, ACM, 2012, retrieved online on Feb. 14, 2019, pp. 1821-1828. Retrieved from the internet: <URL: http://delivery.acm.org/10.1145/2240000/223072/p 1821-kim.pdf?> (Year: 2012).

Caius Brindescu et al.; How Do Centralized and Distributed Version Control Systems Impact Software Changes, ACM, 2014, retrieved online on May 1, 2019, pp. 322-333. Retrieved from the internet:<URL: http://delivery.acm.org/10. 1145/2570000/2568322/ p322-brindescu. pdf?>. (Year: 2014).

Benjamin L. Bullough et al., Predicting Exploitation of Disclosed Software Vulnerabilities Using Open-source Data, CBM, 2017, retried online on Jul. 29, 2019, pp. 45-53. Retrieved from the Internet: <URL: http://delivery.acm.org/10.1145/3050000/3041009/p45-bullough.pdf?>. (Year: 2017).

Jason Gionta et al., HideM: Protecting the Contents of Userspace Memory in the Face of Disclosure Vulnerabilities, ACM, 2015, retrieved online on Nov. 14, 2019, pp. 325-336. Retrieved from the internet: <URL: http://delivery.acm.org/10.1145/2700000/2699107/p325-gionta.pdf?>.(Year:2015).

Jan Paakko, A Software Architecture for Supporting Self-healing Service Compositions, Aug. 5, 2011, Aalto University, retrieved online on Mar. 10, 2020, pp. 1-185. Retrieved from the Internet: <URL: http://citeseerx.ist.psu.edu/viewdoc/download?>. (Year: 2011).

Daniel Bogdan et al., Delta Flashing of an ECU in the Automotive Industry, IEEE, 2016, retrieved online on May 28, 2020, pp. 503-508. Retrieved from the internet: <URL: https://ieeexplore.ieee.org/stamp/stamp.jsp?tp=&arnumber=7507429>. (Year: 2016).

(56) References Cited

OTHER PUBLICATIONS

Syed Shariyar Murtaza et al., Total ADS: Automated Software Anomaly Detection System, IEEE, 2014, retrieved online on Aug. 9, 2020, pp. 83-88. Retrieved from the Internet: <URL: https://ieeexplore.ieee.org/stamp/stamp.jsp?tp=&arnumber=6975641>. (Year: 2014).

* cited by examiner

1000

1002 Access attributes of a software update to be stored on an ECU in a vehicle

1004 Access corresponding attributes of the current software stored on the ECU in the vehicle 1006 Compare the attributes of a software update with the corresponding attributes of the current software 1008 Generate a delta file representing differences between the attributes of a software update with the corresponding attributes of the current software 1008-1 Apply a first grid to the software update 1008-2 Apply a second grid to the current software stored on the ECU 1008-3 Identify the attributes of the software update and the corresponding attributes of the current software based on a comparison of the first and second grids 1010 Integrate startup code into the delta file

```
1102 Receiving a delta file at an Electronic Control Unit (ECU) in the vehicle
```

```
1104 Executing the delta file, based on the startup code, in the ECU

Initializing a runtime library of the delta file

Updating a program counter of the ECU to execute an instruction
    contained in the delta file Extracting data from the delta file for storage on the ECU Linking the delta file to a specific function in a virtual file system associated
    with the delta file Extracting the code for updating memory addresses and update the
    memory addresses in the ECU
```

```
1106 Updating memory addresses in the ECU to correspond to the plurality of deltas
from the delta file
```

1202 Receiving a software update file for an ECU software while the ECU is operating 1204 Writing the software update file into a first ECU memory location while simultaneously executing a code segment of existing code in a second ECU memory location 1206 Updating memory addresses associated with ECU memory without interrupting the execution of the code segment currently being executed in the second ECU memory location 1208 Deleting data representing outdated values of variables referenced by the ECU 1210 Defragmenting the memory of the ECU after completing the software update

1302 Receiving a prompt to adjust an ECU of a vehicle from executing a first version of ECU software to a second version of ECU software 1304 Configuring the second version of ECU software on the ECU for execution based on a delta file corresponding to the second version of ECU software 1306 Configuring the first version of ECU software on the ECU in the vehicle to become non-executable 1308 Determining that utilization of a memory of the ECU is above a threshold 1310 Identifying specific contents of the memory of the ECU for deletion 1312 Determining whether to replace the entire content of the memory of the ECU

1402 Monitoring, in the vehicle, data representing real-time processing activity of the ECU 1404 Accessing, in the vehicle, historical data relating to processing activity of the ECU 1406 Comparing the real-time processing activity data with the historical data to identify at least one anomaly 1408 Implementing a control action for the ECU when the at least one anomaly is identified

- Issuing a prompt to adjust the ECU from executing a first version of ECU software to a second version of ECU software (e.g., rolling back a version of ECU software running on the ECU to a prior version of ECU software)

- Sending an alert associated with the ECU

- Blocking an instruction sent from the ECU

1502 Monitoring data representing real-time processing activity of the ECU

1504 Receiving comparable data relating to processing activity of at least one other ECU

1506 Comparing the real-time processing activity data with the comparable data to identify at least one anomaly

1508 Implementing a control action for the ECU when the at least one anomaly is identified > Issuing a prompt to adjust the ECU from executing a first version of ECU software to a second version of ECU software (e.g., rolling back a version of ECU software running on the ECU to a prior version of ECU software)

> Sending an alert associated with the ECU

> Blocking an instruction sent from the ECU

1602 Receiving, at a controller in a vehicle, a wireless transmission indicating a need to update software running on at least one ECU in the vehicle 1604 Monitoring an operational status of the vehicle to determine whether the vehicle is in a first mode of operation in which an ECU software update is prohibited 1606 Delaying the ECU software update when the operational status is prohibited 1608 Continuing to monitor the operational status of the vehicle to determine whether the vehicle is in a second mode of operation in which the ECU software update is permitted 1610 Enabling updating of the at least one ECU with the delayed ECU software update when it is determined that the vehicle is in the second mode of operation 1612 Determining whether the wireless transmission indicating the need to update the software includes an indication of that the update is with an override status 1614 Updating the ECU software regardless of whether the vehicle is in the first mode of operation when the update is received with the override status

1702 Receiving ECU activity data from at least one vehicle

1704 Determining a software vulnerability affecting the at least one vehicle

1706 Identifying an ECU software update based on the determined software vulnerability 1708 Sending a delta file configured to update software on the ECU 1710 Determining a set of vehicles potentially affected by the software vulnerability 1712 Sending delta files to the set of vehicles

1802 Receiving operational data from a plurality of ECUs in a vehicle

1804 Generating a statistical model of the operational data based on a plurality of runtime attributes 1806 Receiving live, runtime updates from the plurality of ECUs 1808 Identifying an ECU error associated with an ECU based on a comparison of the live, runtime updates with the statistical model of the operational data 1810 Wirelessly sending a report from the vehicle to the remote monitoring server based on the live, runtime updates, the report identifying the ECU and the identified ECU error 1812 Determining whether the ECU error is potentially detrimental 1814 Performing a control action

FIG. 18

SELF-HEALING LEARNING SYSTEM FOR ONE OR MORE CONTROLLERS

CROSS-REFERENCE TO RELATED APPLICATIONS

This application is a continuation of U.S. patent application Ser. No. 16/921,999, filed on Jul. 7, 2020, which is a continuation of U.S. patent application Ser. No. 16/857,547, filed on Apr. 24, 2020, which issued as U.S. Pat. No. 10,747,604, which is a continuation of U.S. patent application Ser. No. 16/751,872, filed on Jan. 24, 2020, which issued as U.S. Pat. No. 10,678,627, which is a continuation of U.S. patent application Ser. No. 16/594,206, filed on Oct. 7, 2019, which issued as U.S. Pat. No. 10,585,661, which is a continuation of U.S. patent application Ser. No. 16/458,360, filed on Jul. 1, 2019, which issued as U.S. Pat. No. 10,481,899, which is a continuation of U.S. patent application Ser. No. 16/360,653, filed on Mar. 21, 2019, which issued as U.S. Pat. No. 10,416,989, which is a continuation of U.S. patent application Ser. No. 16/044,454, filed on Jul. 24, 2018, which issued as U.S. Pat. No. 10,303,460, which claims priority to U.S. Provisional Patent App. No. 62/536,767, filed on Jul. 25, 2017, and U.S. Provisional Patent App. No. 62/560,224, filed on Sep. 19, 2017. The disclosures of the above-referenced applications are expressly incorporated herein by reference in their entireties.

BACKGROUND

Modern vehicles utilize many Electronic Control Units (ECUs) to control operations of components such as engines, powertrains, transmissions, brakes, suspensions, onboard entertainment systems, communication systems, and the like. ECUs control basic operations of modern vehicles, from power steering to breaking to acceleration. In addition, ECUs control numerous add-on and analytical features in vehicles. For example, some cars may be equipped with ECUs configured to collect and analyze driving data, which may be provided to insurance companies to determine insurance premiums. Some cars may be equipped with ECUs configured to enhance the driving experience, and some may be equipped with ECUs configured to provide advanced (or automated) driving assistance.

As ECUs continue to increase in complexity and sophistication, managing software performance, upgrades, and bug fixes on ECUs is becoming a challenge. Currently, there are roughly 60 to 70 ECUs in an average car (and roughly 180 ECUs in a luxury car). These ECUs correspond to tens of millions of lines of code. Maintaining the code is becoming increasingly difficult. Moreover, highly sophisticated software tends to be more prone to vulnerabilities such as software bugs, glitches, and calibration problems. Manufacturers or developers of ECUs may wish to promptly fix these vulnerabilities as soon as they are discovered.

A further type of vulnerability in ECUs relates to ECU errors or faults. An ECU error may be, for example, a runtime error, stack overflow, stack underflow, etc. An ECU fault may be, for example, a deviation in the normal or expected operation of an ECU (e.g., performing a function a certain number of times per time interval, but then "drifting" to perform the function a different number of times, either suddenly or slowly over time). Slowly implemented drifting in the execution of ECU software can be a particularly difficult problem, since it is hard to immediately detect given the lack of any obvious signs of changes to the ECU's operation.

One approach to address these vulnerabilities in affected vehicles is to issue a recall. However, recalls can be time-consuming, and they do not provide any assurance that the affected vehicles will be fixed in a timely manner. Alternatively, manufacturers or developers may attempt to provide fixes to the affected vehicles through on-board diagnostic (OBD) ports or over-the-air (e.g., using various types of wireless communication techniques). Nevertheless, OBD ports are themselves attack surfaces for vehicles, and over-the-air fixes are typically inefficient, inconvenient to the vehicle owner, and prone to introduce yet additional bugs.

Moreover, current attempts of OBD and over-the-air update techniques still have limitations in terms of time and space efficiency. For example, current attempts of over-the-air-update techniques require the manufacturer to distribute a new version of the entire ECU software as a replacement package to the affected vehicles. When the replacement package is received by an affected vehicle, the affected vehicle is required to store the replacement package into a spare memory space (i.e., a memory space not used by the ECU), erase the current version of the ECU software from the memory space used by the ECU, copy the replacement package from the spare memory space into the memory space used by the ECU, and restart the ECU so it can load the new version of the ECU software. This is virtually impossible in ECUs, due to significant storage space limitations and the interruption to the functioning of the ECU. ECUs are nearly full with existing software and data already, and have very limited available storage space for new software or data. Further, there are significant cost limitations associated with providing new software to ECUs. Moreover, interrupting the processing flow of an ECU can be inconvenient or very dangerous, depending on the role of the ECU and the conditions of the vehicle.

There is thus a need for technological solutions to generate, receive, and process update packages for updating software on ECUs without the aforementioned shortcomings. In particular, there is a need for solutions for updating a vehicle with differential software, rather than an entire software module or package, over the air and without a dedicated client on an ECU. Further, solutions should not have a requirement of significant additional memory usage, or any downtime of the ECU itself. In addition, such solutions should not require reprogramming the memory of the ECU. Further, such solutions should allow for rolling back the software version on an ECU to a prior version without the need to download an entire software module, without reprogramming the memory (which can be expensive, time-consuming, and disruptive), and again without significant memory requirements or any downtime of the ECU.

There is also a need for technological solutions to generate data for abnormality detection that will not consume large amounts of data throughput to store or to transmit. Such techniques should provide lean execution performance to keep the main application on an ECU running, with all its resources it needs, and without additional required resources. It would further be advantageous to utilize a distributed vehicle architecture solution that sends only calls for action (e.g., based on anomaly detection through machine learning) to a control center or server for performing responsive actions.

Further, there is a need for technological solutions for the problems that arise based on dependencies between ECUs in vehicles. For example, when the software on one ECU is updated, it may cause the ECU to be unable to communicate with other ECUs in the vehicle. This may occur, for example, when the update to the ECU affects its network address, incoming or outgoing communications policies, format or payload of data communications, timing of communications, protocol of communications, or various other attributes of its functionality. It would be advantageous, therefore, to be able to manage the dependencies between ECUs so that software updates to ECUs can be coordinated and performed on all ECUs that may be impacted by an update.

SUMMARY

The disclosed embodiments describe non-transitory computer readable media and methods for automatically providing updates to at least one vehicle. For example, in an exemplary embodiment, there may be a non-transitory computer readable medium including instructions that, when executed by at least one processor, cause the at least one processor to perform operations for automatically providing updates to at least one vehicle. The operations may comprise: receiving, at a server remote from the at least one vehicle, Electronic Control Unit (ECU) activity data from the at least one vehicle, the ECU activity data corresponding to actual operation of the ECU in the at least one vehicle; determining, at the server and based on the ECU activity data, a software vulnerability affecting the at least one vehicle, the software vulnerability being determined based on a deviation between the received ECU activity data and expected ECU activity data; identifying, at the server, an ECU software update based on the determined software vulnerability; and sending, from the server, a delta file configured to update software on the ECU with a software update corresponding to the identified ECU software update.

According to a disclosed embodiment, the least one vehicle includes a plurality of vehicles being monitored as a group.

According to a disclosed embodiment, the plurality of vehicles includes a first set of vehicles having a common ECU type.

According to a disclosed embodiment, determining the software vulnerability comprises: determining a software vulnerability affecting the first set of vehicles.

According to a disclosed embodiment, determining the software vulnerability further comprises: determining, based on the ECU activity data, a second set of the plurality of vehicles potentially affected by the software vulnerability.

According to a disclosed embodiment, sending the delta file configured to update software on the ECU with the software update comprises: sending a plurality of delta files to the first set and the second set of vehicles.

According to a disclosed embodiment, the ECU software update comprises a prompt to adjust the ECU from executing a first version of ECU software to a second version of ECU software.

According to a disclosed embodiment, the instructions further comprise: configuring, in response to the prompt and based on a delta file corresponding to the second version of ECU software, the second version of ECU software on the ECU for execution; and configuring, in response to the prompt, the first version of ECU software on the ECU to become non-executable.

According to a disclosed embodiment, the second version of ECU software is deployed subsequent to the first version of ECU software.

According to a disclosed embodiment, the second version of ECU software is deployed prior to the first version of ECU software.

According to a disclosed embodiment, the software on the ECU is mapped to a plurality of functional units, and the ECU is configured to utilize a virtual file system (VFS) to manage and track one or more versions of each of the plurality of functional units.

According to a disclosed embodiment, the second version of ECU software is the first version of ECU software having one or more functional units disabled by the VFS.

According to a disclosed embodiment, the delta file comprises startup code integrated into the delta file and configured for executing the delta file in the ECU.

According to a disclosed embodiment, the ECU software update comprises an installation agent for installing the ECU software update on the ECU.

According to a disclosed embodiment, the ECU software update is configured to recalibrate ECUs in the plurality of vehicles.

According to a disclosed embodiment, the instructions further comprise: instructing the ECU of the least one vehicle to reboot in response to the ECU software update.

According to a disclosed embodiment, a system may be implemented for automatically providing updates to at least one vehicle. The system may comprise: one or more processors; and one or more memories having instructions that, when executed by the one or more processors, cause the one or more processors to perform the operations of: receiving, at a server remote from the at least one vehicle, Electronic Control Unit (ECU) activity data from the at least one vehicle, the ECU activity data corresponding to actual operation of the ECU in the at least one vehicle; determining, at the server and based on the ECU activity data, a software vulnerability affecting the at least one vehicle, the software vulnerability being determined based on a deviation between the received ECU activity data and expected ECU activity data; identifying, at the server, an ECU software update based on the determined software vulnerability; and sending, from the server, a delta file configured to update software on the ECU with a software update corresponding to the identified ECU software update.

According to a disclosed embodiment, the least one vehicle includes a first set of vehicles having a common ECU type, and the one or more processors are further configured to perform the operations of: determining the software vulnerability affecting the first set of vehicles; and determining, based on the ECU activity data, a second set of vehicles potentially affected by the software vulnerability.

According to a disclosed embodiment, the one or more processors are further configured to perform the operations of: sending the ECU software update to the first set and the second set of vehicles.

According to a disclosed embodiment, a method may be implemented for automatically providing updates to at least one vehicle. The method may comprise: receiving, at a server remote from the at least one vehicle, Electronic Control Unit (ECU) activity data from the at least one vehicle, the ECU activity data corresponding to actual operation of the ECU in the at least one vehicle; determining, at the server and based on the ECU activity data, a software vulnerability affecting the at least one vehicle, the software vulnerability being determined based on a deviation between the received ECU activity data and expected ECU activity data; identifying, at the server, an ECU software update based on the software vulnerability; and sending, from the server, a delta file configured to update software on the ECU with a software update corresponding to the identified ECU software update.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings:

FIG. 10 is an exemplary flowchart showing a process for generating an update package for updating software on an ECU in a vehicle in accordance with disclosed embodiments.

FIG. 11 is an exemplary flowchart showing a process for receiving and integrating a delta file in a vehicle in accordance with disclosed embodiments.

FIG. 12 is an exemplary flowchart showing a process for performing updates to ECU software while an ECU of a vehicle is operating in accordance with disclosed embodiments.

FIG. 13 is an exemplary flowchart showing a process for adjusting vehicle ECU software versions in accordance with disclosed embodiments.

FIG. 14 is an exemplary flowchart showing a process for identifying ECU anomalies in a vehicle in accordance with disclosed embodiments.

FIG. 15 is an exemplary flowchart showing a process for identifying ECU anomalies in a vehicle in accordance with disclosed embodiments.

FIG. 16 is an exemplary flowchart showing a process for opportunistically updating ECU software in a vehicle in accordance with disclosed embodiments.

FIG. 17 is an exemplary flowchart showing a process for automatically providing updates to one or more vehicles in accordance with disclosed embodiments.

FIG. 18 is an exemplary flowchart showing a process for reporting ECU errors to a remote monitoring server in accordance with disclosed embodiments.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

Reference will now be made in detail to the disclosed embodiments, examples of which are illustrated in the accompanying drawings.

Figure 1A:
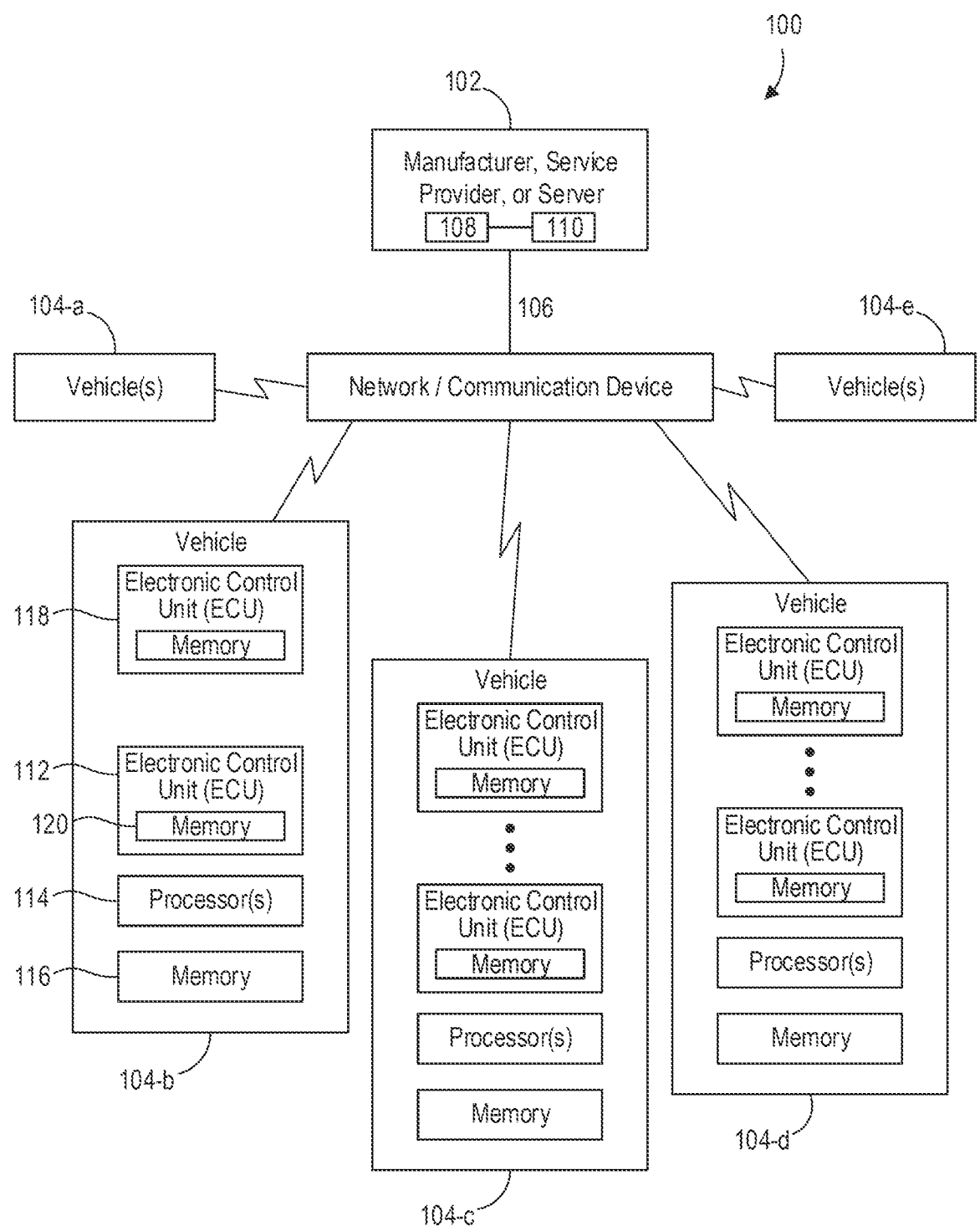
FIG. 1A is a block diagram of an example system in accordance with disclosed embodiments.

FIG. 1A is a block diagram of an example system 100 in accordance with disclosed embodiments. As shown, system 100 includes one or more server (or computer) 102 configured to communicate with one or more vehicles 104 over a communication channel 106. Communication channel 106 may include a bus, a cable, a wireless communication channel, a radio-based communication channel, the Internet, a local area network (LAN), a wireless local area network (WLAN), a wide area network (WAN), a cellular communication network, or any Internet Protocol (IP) based communication network and the like. In some embodiments, communication channel 106 may be based on public cloud infrastructure, private cloud infrastructure, hybrid public/private cloud infrastructure, or no cloud infrastructure. In such differing embodiments, server 102 and vehicles 104 may each be in the same, or in different, networks or network segments. In some embodiments, vehicles 104 may be equipped with one or more compatible receivers configured to support communications with server 102 via communication channel 106. The receivers are not shown in FIG. 1A for illustrative simplicity.

Server 102 may include at least one processor 108. In embodiments involving multiple servers (e.g., a server farm), processor 108 may include one or more dedicated processing units, application-specific integrated circuits (ASICs), field-programmable gate arrays (FPGAs), or various other types of processors or processing units coupled with at least one non-transitory processor-readable memory 110 configured for storing processor-executable code. When the processor-executable code is executed by processor 108, processor 108 may carry out various different instructions (e.g., to determine whether one or more ECUs installed in one or more vehicles 104 need to be updated, etc.). Processor 108 may also carry out instructions to generate update packages for the ECUs when it is determined that one or more ECUs installed in one or more vehicles 104 need to be updated. As discussed below, processor 108 may also perform various other functions.

It is contemplated that server 102 may be configured to serve various types of users. For example, an automaker may utilize server 102 to generate and rollout software updates to ECUs installed on vehicles manufactured by the automaker. In another example, a component manufacturer (e.g., an ECU developer, or manufacturer whose products use ECUs) may utilize server 102 to generate and rollout software updates to ECUs produced or maintained by that component manufacturer. In still another example, a service provider (e.g., a dealership or a service center) may utilize server 102 to update ECUs installed on vehicles that are being serviced at the service provider. It is to be understood that while only one server 102 is depicted in FIG. 1A, such a depiction is merely exemplary and is not meant to be limiting. It is contemplated that more than one server 102 may be utilized, and that different users may utilize different servers 102 to generate and rollout software updates to ECUs without departing from the spirit and scope of the present disclosure.

Figure 1B:
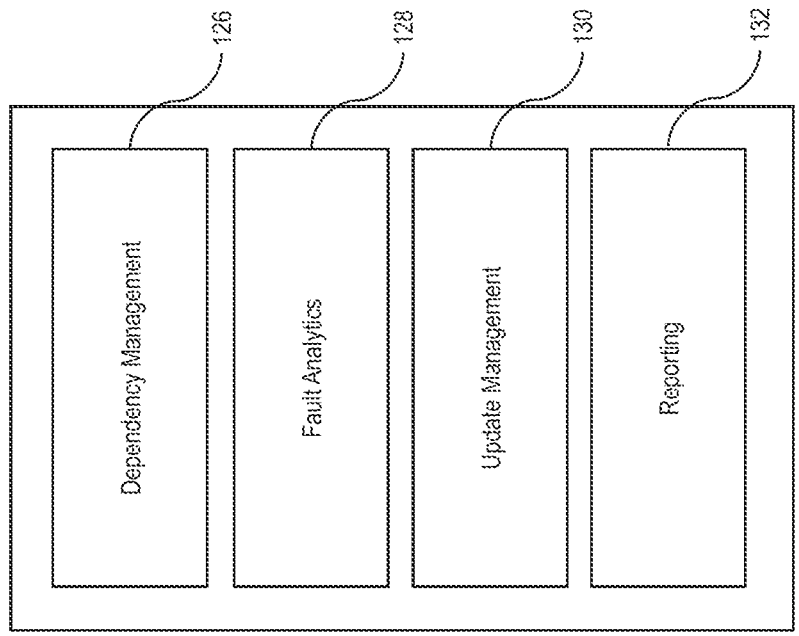
FIG. 1B is an illustration of a system environment in which delta files may be created and deployed, and ECU operations may be monitored in accordance with disclosed embodiments.
Figure 1B:
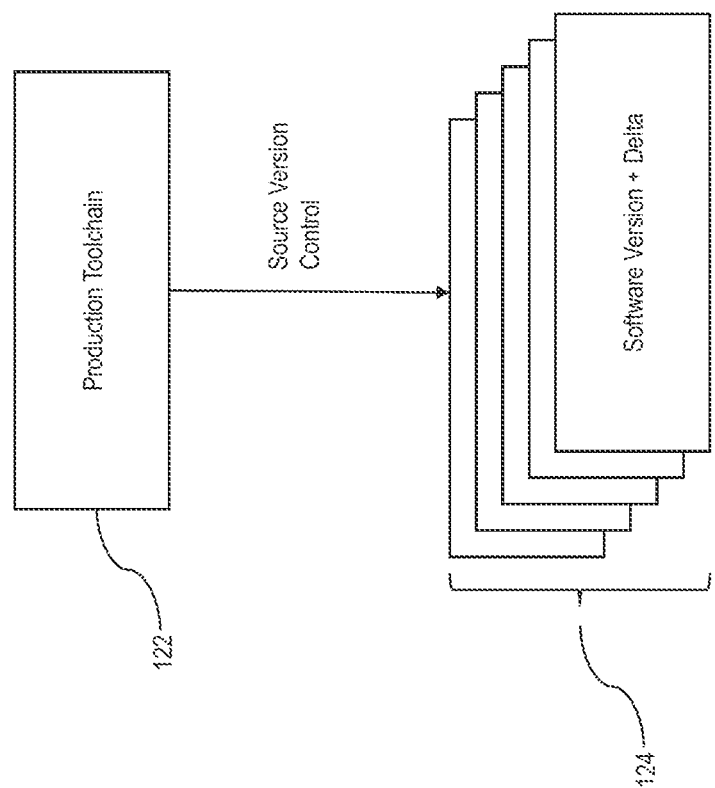

FIG. 1B is an exemplary illustration of system environments in which delta files and software updates may be generated and monitored. As illustrated, a production toolchain 122 may be a group of programming systems or tools for developing and distributing software that runs on vehicle ECUs (e.g., ECU 112). Production toolchain 122 may include the software components (e.g., compiler, linker, libraries, etc.) for developing and implementing software on vehicle ECUs. As discussed further below, the embodiments of this disclosure relate to generating delta files for software updates, and may be generated based on information from the production toolchain 122. For example, as discussed below, the map file, source, and binary data elements used to build delta files (e.g., in connection with FIG. 3) may come from the production toolchain 122. Software updates may be developed as delta files 124, which may be delivered to vehicles over the air, as discussed further in connection with FIG. 1A.

FIG. 1B also illustrates a dependency management system 126, fault analytics system 128, update management system 130, and reporting system 132. In various embodiments discussed below, the dependencies between software versions may be expressed as a map file defining the relationships and dependencies between functions and entities in the software, the size of the software, specific memory addresses, specific functions or commands corresponding to memory locations, etc. Further, dependency management system 126 may identify dependencies between ECUs. For example, when a software update is performed for one ECU, the update may cause the ECU to be unable to communicate (or to incorrectly communicate) with one or more other ECUs. This may occur, for example, if the software update affects the network address of an ECU, the protocol of communications the ECU will use, the incoming or outgoing communications policies of the ECU, the headers or payload of communications from the ECU, the timing of communications from the ECU, or various other attributes of the ECU's functionality. In order to prevent conflicts that arise when a software update is performed on an ECU and other interdependent ECUs are affected, dependency management system 126 may be configured to maintain lists or mappings of dependencies between ECUs. The lists or mappings may identify interdependent ECUs, and may also further specify reasons for their interdependency (e.g., particular formats of data communications that are expected or required, particular network addresses, particular communications timing requirements, etc.). This information may be maintained by dependency management system 126, and may be periodically updated (e.g., from server 102).

Further, as discussed below, various anomalies, errors, and faults may be detected in the operation of ECUs. Such data, and algorithms for detecting such events, may be managed by fault analytics system 128. Update management system 130 may be responsible for determining when ECU software updates should be developed or transmitted, which vehicles or specific ECUs should receive the updates, and various other types of information. Reporting system 132 may be configured to receive updates from vehicles (e.g., observed activity of ECUs) or deliver reports to vehicles (e.g., regarding updates to perform). In some embodiments, dependency management system 126, fault analytics system 128, update management system 130, and reporting system 132 may be implemented in server 102, or separately.

Figure 1C:
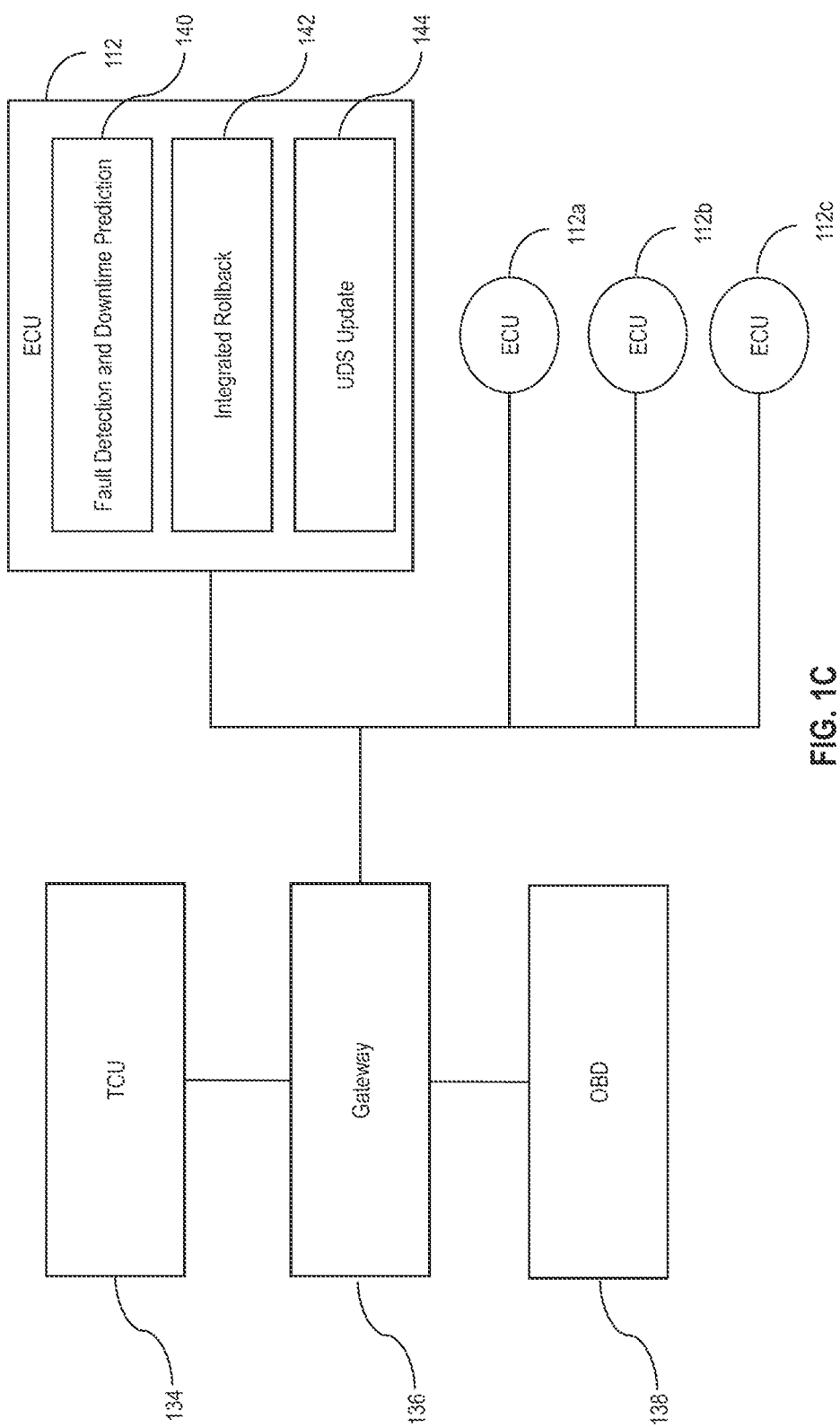
FIG. 1C is an illustration of a vehicle communications network in accordance with disclosed embodiments.

FIG. 1C is an illustration of the architecture in a vehicle communications network (e.g., in vehicle 104-a, 104-b, 104-c, 104-d, or 104-e). For example, a telematic control unit (TCU) 134 may be integrated into the network to perform various tracking features for the vehicle. In some embodiments, TCU 134 may include an integrated or separate telecommunications transceiver (e.g., cellular, WiFi, satellite, etc.), a global positioning system (GPS) transceiver, and a controller for interfacing with other components of the vehicle communications network. The network may also include a gateway 136, which may be the central point of communications with an outside network (e.g., server 102) and the internal network of the vehicle. In some embodiments, gateway 136 may interface with an orchestrator (discussed further below), which controls one or more operations of ECUs 112 in the vehicle. The network may further include an onboard diagnostics port 138, which may be a physical port allowing a wired connection to the vehicle network for diagnostics, maintenance, and other functions. In addition, the vehicle network may include various ECUs, such as ECUs 112, 112a, 112b, 112c, and others. As illustrated, ECU 112 may be configured with software instructions for fault detection and downtime prediction 140, integrated rollback 142 to prior versions of ECU software, and unified diagnostic services (UDS) updates 144, among other operations. These functions are further discussed below.

Figure 2:
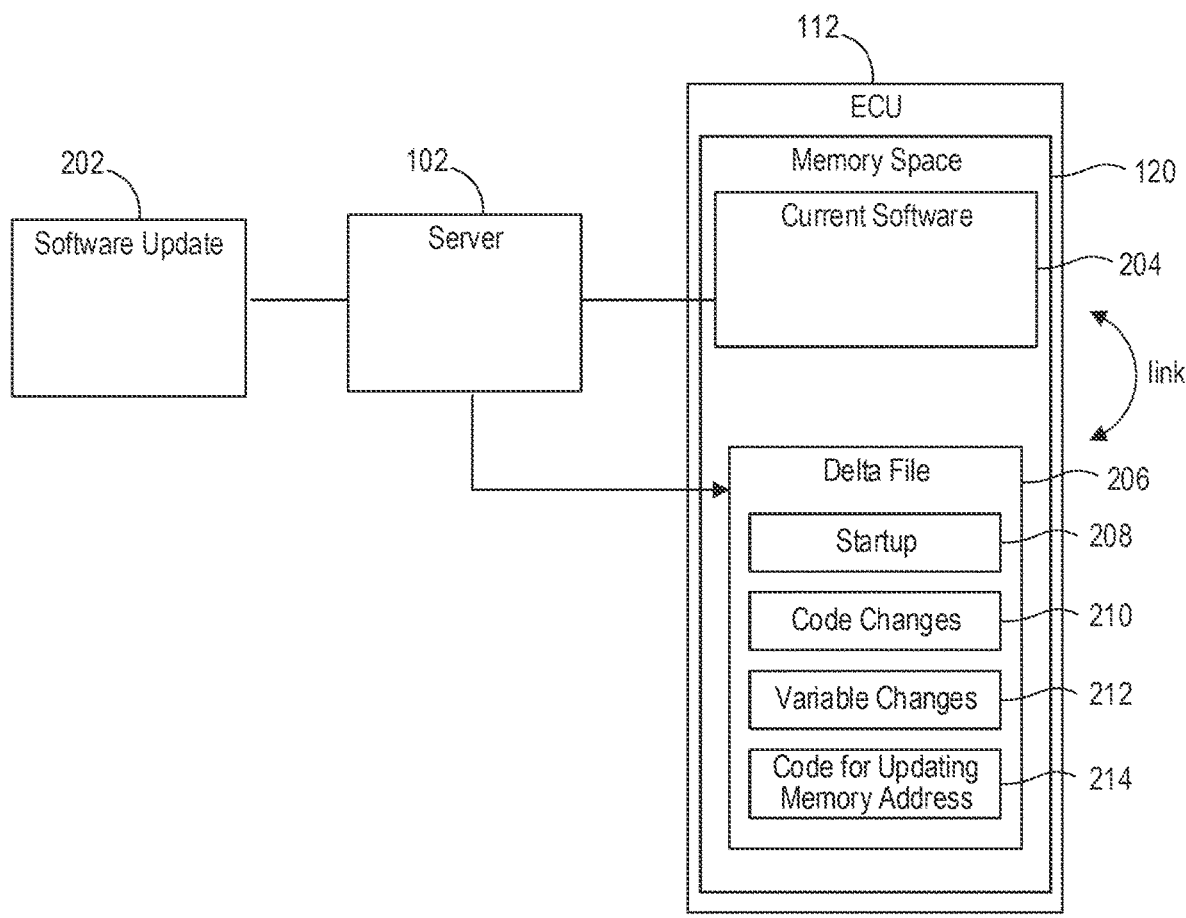
FIG. 2 is an illustration depicting an exemplary ECU software update process in accordance with disclosed embodiments.

FIG. 2 is an illustration depicting an exemplary ECU software update process carried out by server 102 to update software of an exemplary ECU 112. In some embodiments, the process may be performed locally in a vehicle rather than at the server 102 (e.g., through an orchestrator in the vehicle that manages ECUs 118). As shown in FIG. 2, server 102 may access information regarding both a new version of the ECU software (may be referred to as software update 202) to be used by ECU 112 and the current version of the ECU software (may be referred to as current software 204) used by ECU 112. Server 102 may access information regarding software update 202 in various manners. In some embodiments, automakers or component manufacturers responsible for developing or maintaining the ECU software may provide a copy of software update 202 to be stored locally on server 102. In some embodiments, a work station used to develop software update 202 may be configured to serve as server 102. In some embodiments, automakers or component manufacturers may also store copies of software update 202 in one or more network storage devices that are accessible to server 102. In some embodiments, software update 202 may be provided as a monolithic file. In some embodiments, software update 202 may be provided as a file interdependent on other files.

Server 102 may access information regarding current software 204 used by ECU 112 in various manners. In some embodiments, server 102 may query ECU 112 (e.g., via communication channel 106) for its software version number. In some embodiments, server 102 may request direct access to a memory device (e.g., a flash memory, RAM, ROM, etc.) 120 where current software 204 used by ECU 112 is stored. In some embodiments, server 102 may keep a record of software versions deployed to ECUs and use the record to determine the version of current software 204 used by ECU 112. It is contemplated that while specific implementations may vary, as long as server 102 can access information regarding both software update 202 and current software 204, server 102 can compare attributes of both software update 202 and current software 204 and generate a delta file representing the differences between attributes of software update 202 and the corresponding attributes of current software 204, as further discussed below.

Figure 3:
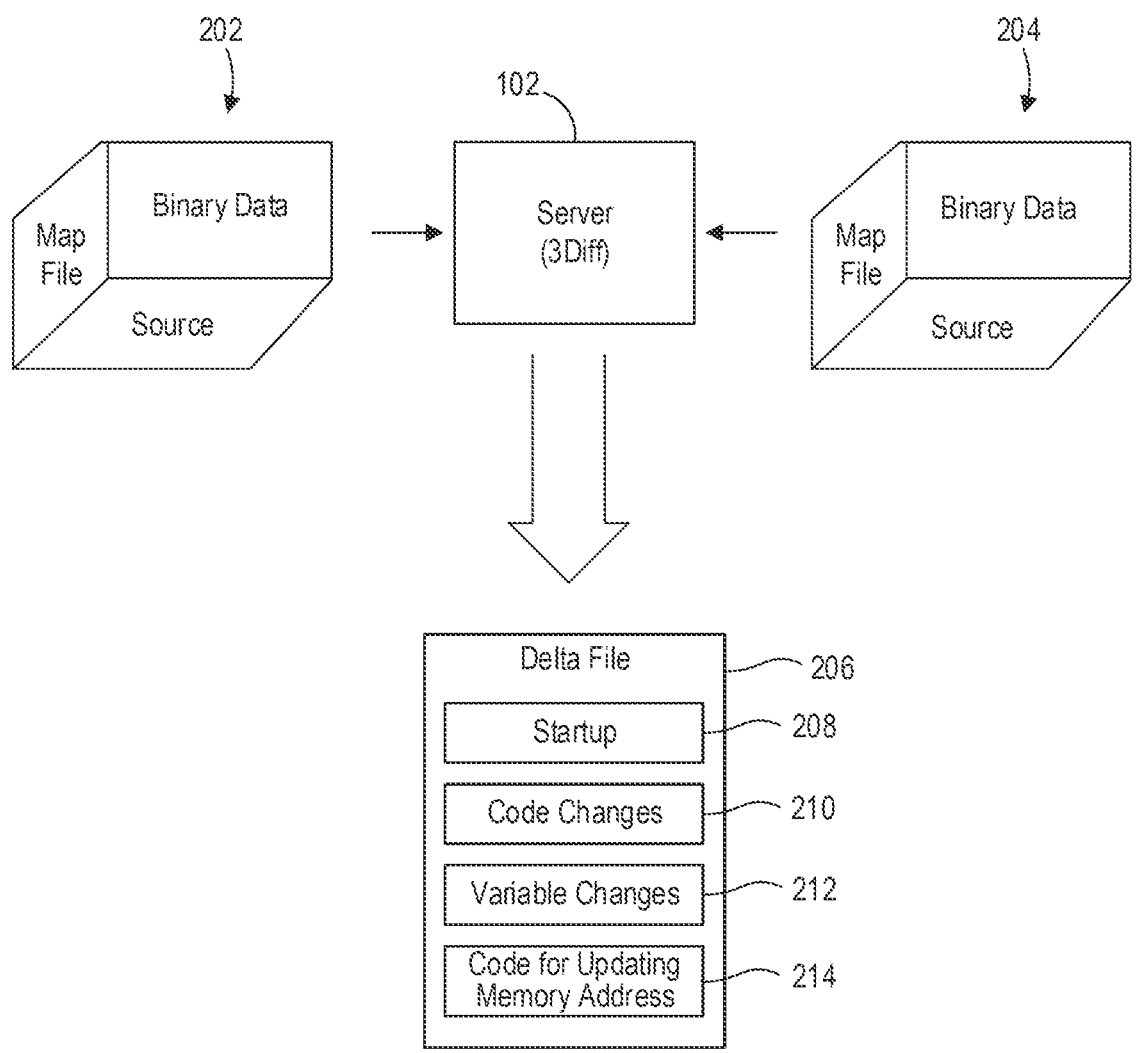
FIG. 3 is an illustration depicting an example process to generate a delta file in accordance with disclosed embodiments.

FIG. 3 is an illustration depicting an example process carried out by server 102 to generate such a delta file. As shown in FIG. 3, server 102 may compare attributes including the source, the binary code, and the map file of software update 202 with their corresponding attributes of current software 204. As discussed above, these attributes may be obtained directly from the production toolchain 122 (e.g., as part of, or following, the software build and deploy processes). The source attribute may identify, for example, the source code language, version, whether the source code is flat, the number or type of objects referenced in the source code, and other attributes. The binary attribute may be represented as Executable and Linkable Format (ELF) code (e.g., with program header, section header, data, etc.), as pure binary, or in other forms. The map file may describe relationships and dependencies between functions and entities in the software 202 and/or 204, the size of the software, specific memory addresses, specific functions or commands corresponding to memory locations, etc.

Representing software update 202 and current software 204 in terms of their source, binary code, and map file attributes may be referred to as a "grid" representation, and a comparison between a grid representing software update 202 and a grid representing current software 204 may be referred to as a multi-dimensional (e.g., three-dimensional differential (or 3Diff) comparison). In some embodiments, fewer or additional dimensions may be used as well. Such a 3Diff comparison, or other multi-dimensional comparison, may be utilized to produce a delta file 206 that may include data representing changes made to the binary and/or the source code 210 of ECU 112, changes made to one or more variables 212 used by ECU 112, and changes made to memory addresses 214 referenced by ECU 112. Notably, such a 3Diff file may represent the differences between software update 202 and current software 204, so that current software 204 can be upgraded to software update 202 by receiving only the 3Diff file, and not the entire software update 202 itself.

Also shown in FIG. 3 is a startup code 208, which may be integrated into 3Diff or delta file 206. Alternatively, startup code 208 may be a part of current software 204 and not a part of delta file 206. For example, in such embodiments, startup code 208 may be the preexisting startup or initialization code associated with an ECU and its software.

Figure 4:
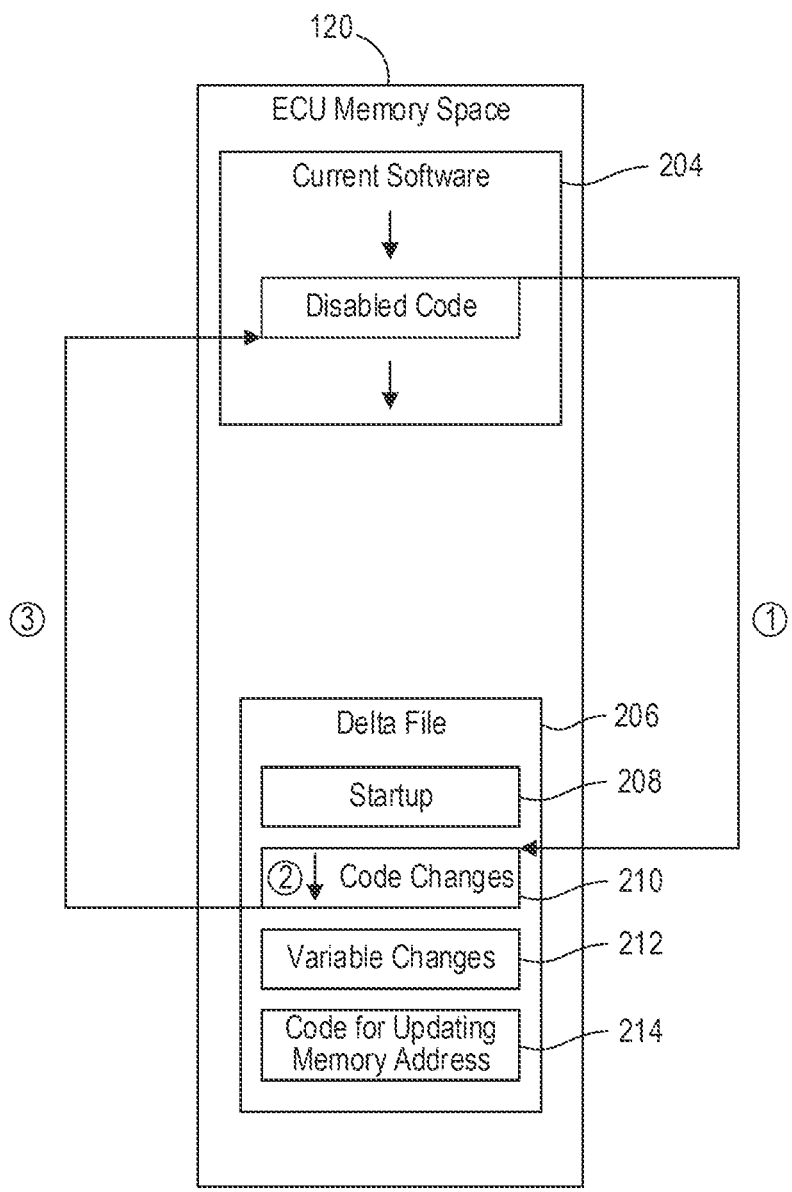
FIG. 4 is an illustration depicting startup code configured to update a program counter of an ECU in accordance with disclosed embodiments.

In some embodiments, server 102 may configure startup code 208 to initialize a runtime library of delta file 206. In some embodiments, for example, server 102 may configure startup code 208 to update a program counter of ECU 112 to skip certain code contained in current software 204 and execute certain code contained in delta file 206 instead. For example, as shown in FIG. 4, startup code 208 may be configured to update the program counter of ECU 112 so that ECU 112 may skip a segment of code contained in current software 204 (depicted as program counter update "1" in FIG. 4) and execute a segment of code contained in delta file 206 instead (depicted as program counter update "2" in FIG. 4). Server 102 may also configure startup code 208 to update the program counter of ECU 112 so that after the execution of the segment of code contained in delta file 206, the program counter may link the execution back to the code contained in current software 204 (depicted as program counter update "3" in FIG. 4). In this manner, the segment of code contained in delta file 206 can be placed anywhere in memory 120, and the program counter of ECU 112 can be used to load that segment of code into a memory (e.g., flash, RAM, etc.) of ECU 112 for execution. In other words, the code contained in delta file 206 may be position-independent and can be placed in memory 120 without requiring ECU 112 to erase any existing contents of memory 120. Further, startup code 208 may be configured to extract the delta data from the 3Diff or delta file 206, and store it on the memory (e.g., flash, RAM, ROM, etc.) of the ECU 112. The data may include data used during runtime of the software 202/204. The startup code may also determine if old contents of the memory in the ECU 112 need to be erased (e.g., because storage space is almost full).

It is to be understood that using the program counter of ECU 112 to load the code contained in delta file 206 into the memory of ECU 112 is presented merely as an example and is not meant to be limiting. In some embodiments, a bootstrap loader (e.g., a program that resides in the memory of ECU 112) may be used to load the code contained in delta file 206 into the memory of ECU 112 instead or in conjunction. It is to be understood that other techniques may also be used to load the code contained in delta file 206 into the memory of ECU 112 for execution without departing from the spirit and scope of the present disclosure.

Figure 5:
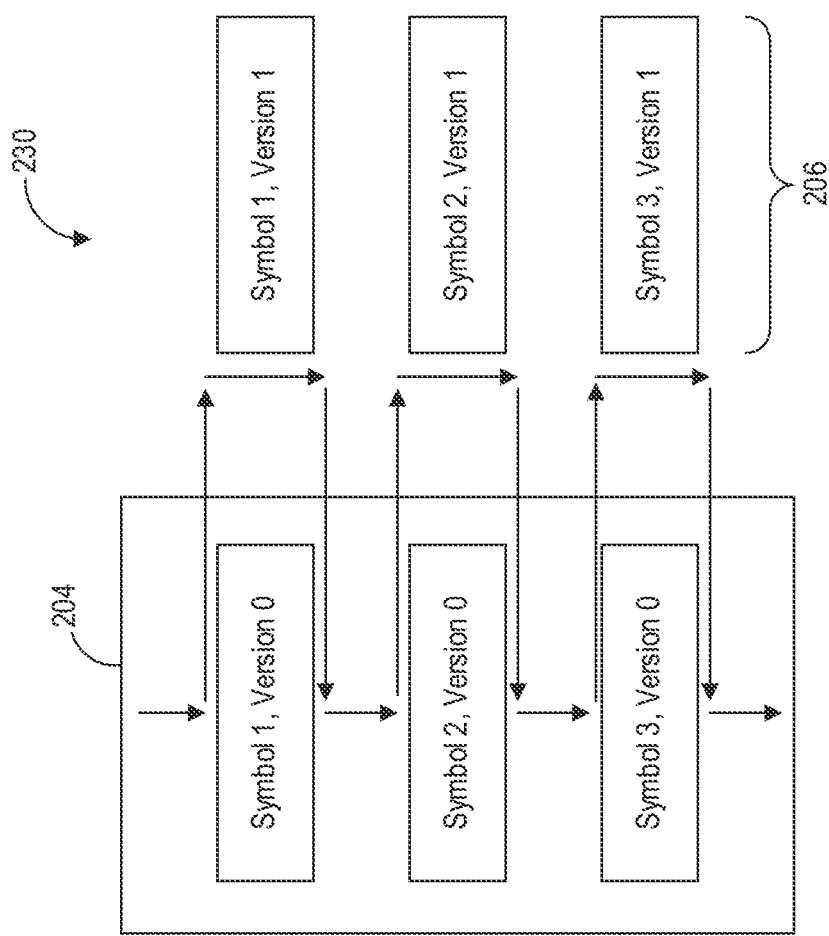
FIG. 5 is an illustration depicting a delta file that includes code changes to different segments of code in accordance with disclosed embodiments.

It is also to be understood that while FIG. 4 depicts redirecting the program counter of ECU 112 from one segment of code contained in current software 204 to another segment of code contained in delta file 206, such a depiction is merely exemplary. It is contemplated that code changes 210 contained in delta file 206 may represent changes made to more than one segment of code contained in current software 204. For example, as shown in FIG. 5, delta file 206 may include code changes to three different segments of code referred to as "Symbol 1," "Symbol 2," and "Symbol 3." It is contemplated that these code changes may be handled in manners similar to that described above. That is, the startup code contained in delta file 206 (or, alternatively, in current software 204), may update the program counter of ECU 112 to skip certain segments of code (i.e., symbols) contained in current software 204 of ECU 112 and load the corresponding segments of code (i.e., the corresponding symbols) contained in delta file 206 into the memory (e.g., flash, RAM, etc.) of ECU 112 for execution instead.

Figure 6:
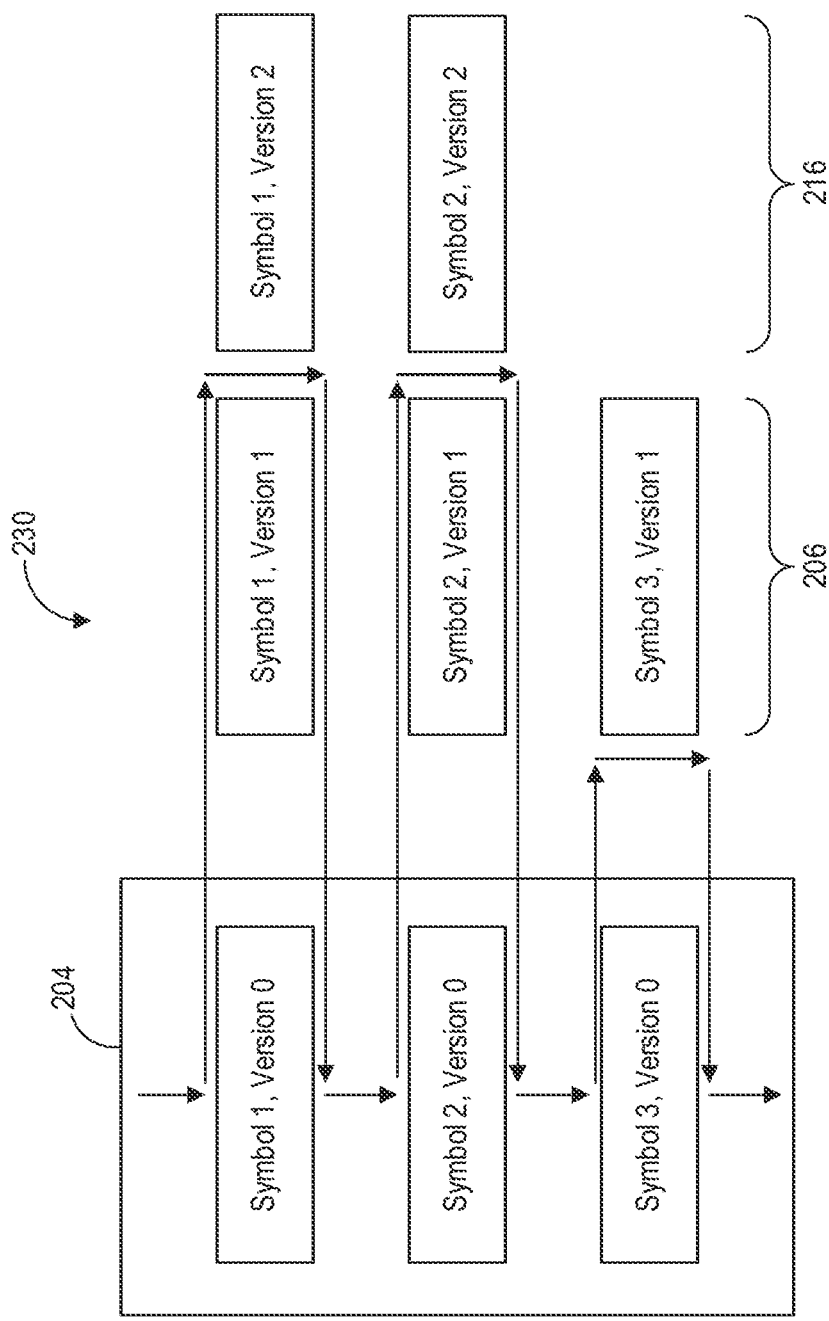
FIG. 6 is an illustration depicting a delta file made available to an ECU for an update in accordance with disclosed embodiments.
Figure 7:
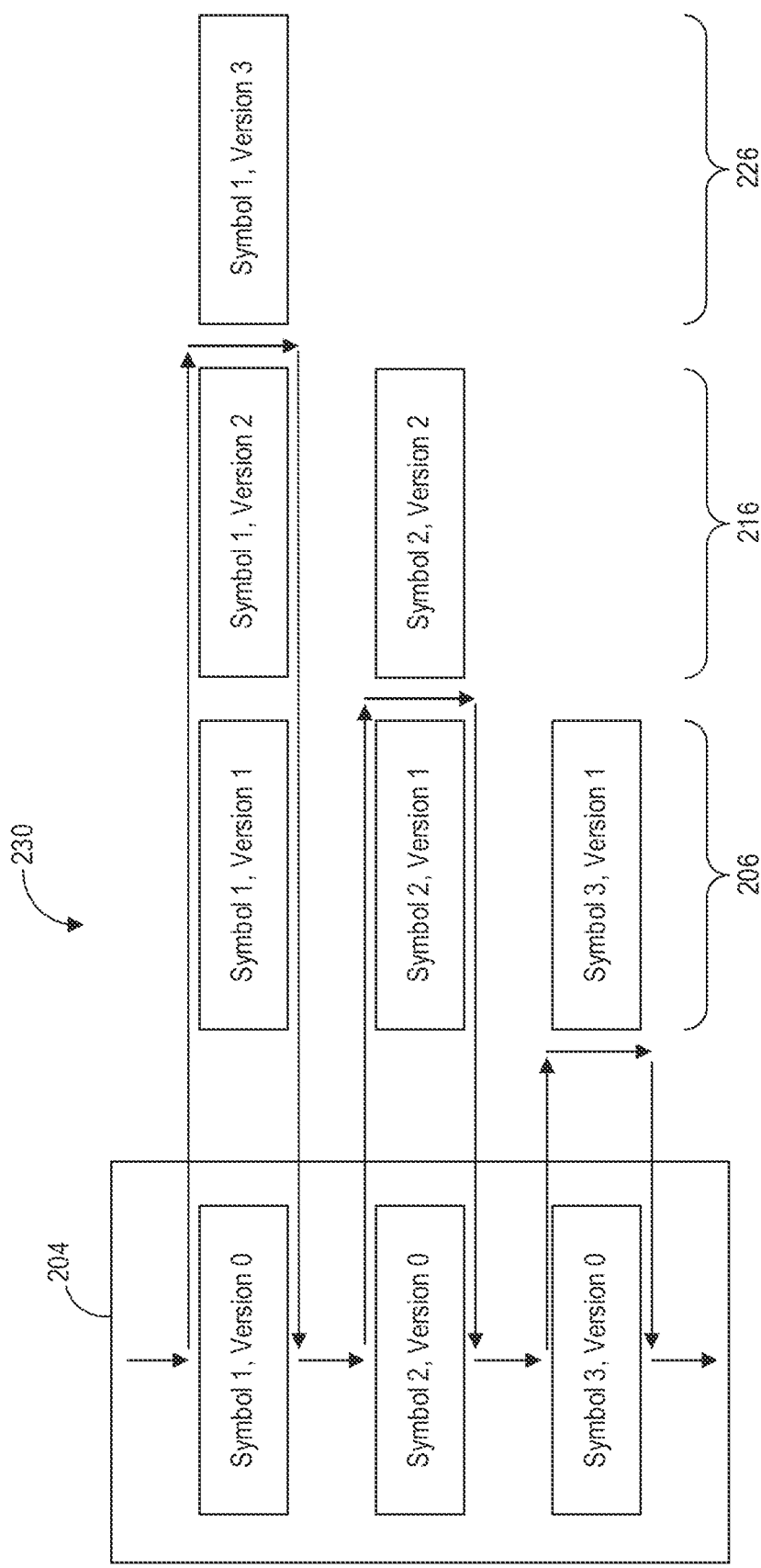
FIG. 7 is another illustration depicting a delta file made available to an ECU for an update in accordance with disclosed embodiments.

In some embodiments, ECU 112 may utilize a virtual file system (VFS) 230 to manage the symbols. As discussed herein, VFS 230 may be a variety of different types of virtual file systems, databases, or lists. VFS 230 may provide an abstraction of the software 202/204, and may express the elements of the 3Diff file (e.g., source, binary, and map file attributes). In some embodiments, ECU 112 may utilize VFS 230 to track different versions of the symbols. For example, as shown in FIG. 6, if a second delta file 216 (representing changes made in a second software update) is made available to ECU 112, and if second delta file 216 contains Version 2 of code changes made to Symbol 1 and Symbol 2, ECU 112 may utilize VFS 230 to track the different versions of the symbols and determine the correct version to be used for execution. If a third delta file 226 (representing changes made in a third software update) is made available to ECU 112, and if third delta file 226 contains Version 3 of code changes made to Symbol 1, ECU 112 also may utilize VFS 230 to track Version 3 of Symbol 1, as shown in FIG. 7.

Figure 8:
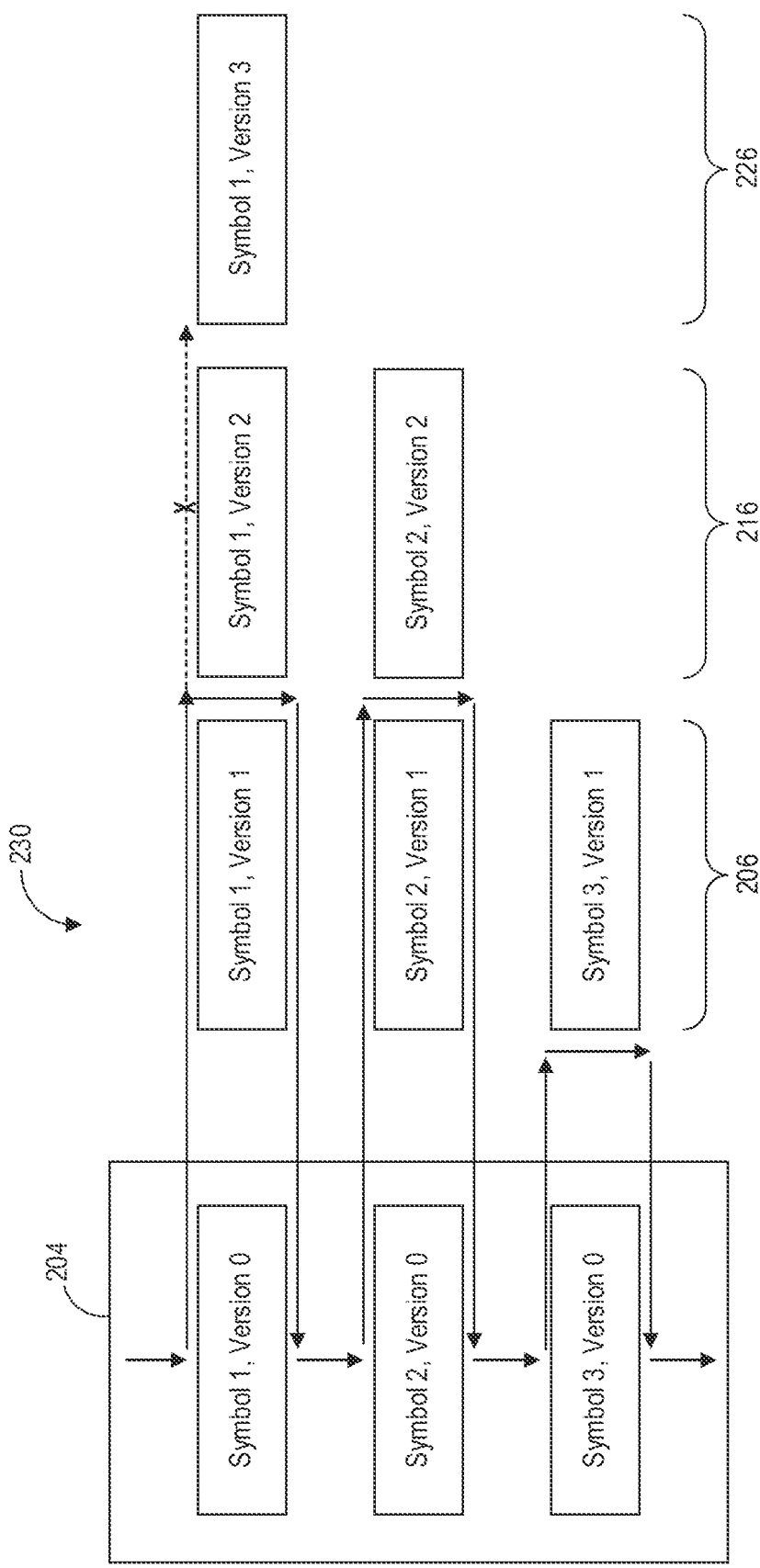
FIG. 8 is a further illustration depicting a delta file made available to an ECU for an update in accordance with disclosed embodiments.

In some embodiments, ECU 112 may utilize VFS 230 to roll back certain changes to ECU 112's software if needed. For example, upon detection of certain anomalies (details of which will be described later) in the performance of ECU 112, server 102 may determine that Version 3 of Symbol 1 should be rendered non-executable (or disabled) and that the ECU software should be reverted back to a previous version (e.g., the second software update). Server 102 may achieve this by prompting ECU 112 to roll back to the second software update, and ECU 112 may in turn utilize VFS 230 to reinstitute Symbol 1, Version 2 (and disable Symbol 1, Version 3) by updating memory addresses in ECU 112 corresponding to these symbols, as shown in FIG. 8. Effectively, Version 3 of Symbol 1 may be removed from the memory (e.g., flash, RAM, etc.) of ECU 112 and Version 2 of Symbol 1 may be loaded into the memory of ECU 112 for execution instead. Notably, however, there is no need to delete Version 3 of Symbol 1 and download an entire copy of Version 2 of Symbol 1. Instead, as discussed further below, the ECU 112 may simply receive a delta file 206 identifying the updates to the ECU 112's memory that need to be updated (based on the source, binary, and map file attributes) to accomplish the reversion back to Version 2 of Symbol 1. Using this technique, bandwidth is reduced in the transmission to ECU 112 and memory space in ECU 112 is also saved. This technique is discussed further below.

Referring now back to FIG. 3. It is noted that in addition to handling code changes, server 102 may also configure startup code 208 to handle changes made to variables used by ECU 112 as well as changes made to memory addresses referenced by ECU 112. Specifically, in some embodiments, server 102 may configure startup code 208 to extract variable change data 212 from delta file 206 and place the extracted variable data (if any) into the memory (e.g., flash, RAM, etc.) of ECU 112. As noted above, startup code 208 may be located in the delta file 206 itself, or in the current software 204. Server 102 may also configure startup code 208 to include instructions to delete old (outdated) variable data from the memory of ECU 112. Server 102 may further configure startup code 208 to extract memory addresses change data 214 (if any) from delta file 206 and update the memory addresses in ECU 112 accordingly. In this manner, server 102 may simply place delta file 206 into memory 120 without having to make any changes to current software 204, and let ECU 112 execute startup code 208 contained in delta file 206 or current software 204 to link current software 204 and delta file 206 together to form a functional equivalent of software update 202 without the need to reboot ECU 112.

In some embodiments, delta file 206 may be implemented as a standard hexadecimal or binary file (or other types, such as S Record, Motorola™, and others), which can be readily processed by ECU 112. In some embodiments, ECU 112 may continue its operation (e.g., continue to execute code contained in current software 204) as delta file 206 is being placed into memory 120. In some embodiments, ECU 112 may defragment memory 120 after completing the update process described above. It is contemplated, however, that defragmenting memory 120 may only needed infrequently, and not for every software update.

Figure 9:
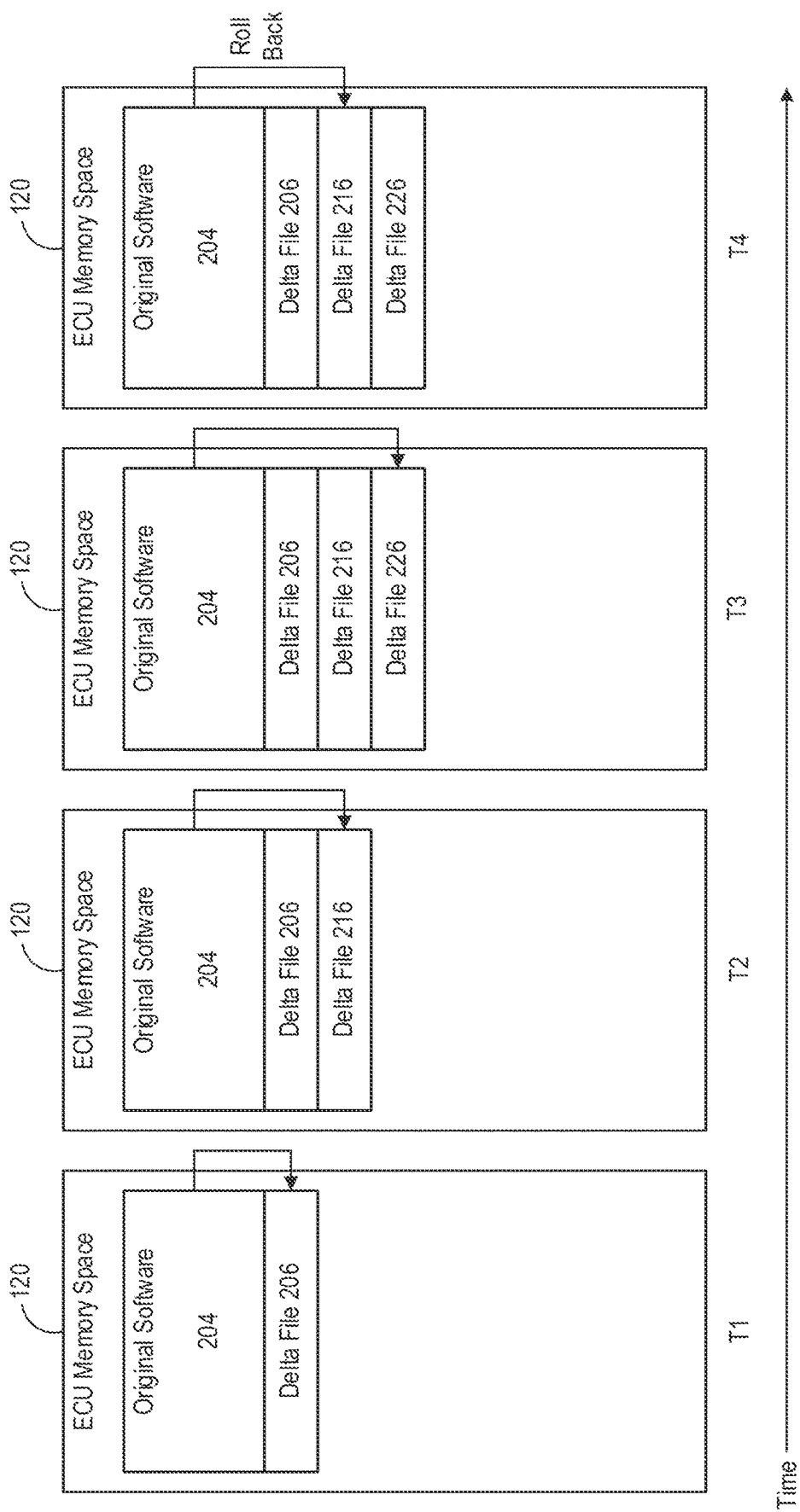
FIG. 9 is an illustration depicting a timeline view of software updates made available to an ECU in accordance with disclosed embodiments.

The update process may be repeated a number of times as subsequent software updates become available. As illustrated in FIG. 9, suppose that, at time T1, a first software update is made available and server 102 generated delta file 206 and provided delta file 206 to ECU 112. Once delta file 206 is received at ECU 112 (and stored into memory 120), ECU 112 may execute delta file 206 based on the startup code contained therein and link delta file 206 to software 204 of ECU 112 as described above. If, at time T2, a second software update becomes available to replace the first software update, server 102 may repeat the process described above (e.g., compare the second software update to software 204 of ECU 112, generate a second delta file 216, and provide second delta file 216 to ECU 112). Once second delta file 216 is received at ECU 112 (and stored into memory 120), ECU 112 may execute second delta file 216 based on the startup code contained therein and link second delta file 216 to software 204 of ECU 112. Similarly, if, at time T3, a third software update becomes available, server 102 may provide a third delta file 226 to ECU 112, and ECU 112 may link third delta file 226 to software 204 of ECU 112 accordingly.

Also illustrated in FIG. 9 is the ability for server 102 to roll back a particular software update. For example, upon detection of certain anomalies (details of which will be described later) at time T4, server 102 may determine that the third software update should be rendered non-executable and that the ECU software should be reverted back to a previous version (e.g., the second software update). Server 102 may achieve this by prompting ECU 112 to remove the link between third delta file 226 and software 204 of ECU 112 (e.g., rendering the code changes contained in delta file 226 non-executable, as previously described with reference to FIG. 8), and re-execute the startup code contained in second delta file 216 to re-establish the link between second delta file 216 and software 204 of ECU 112, as shown in FIG. 9.

In some embodiments, ECU 112 may be configured to keep third delta file 226 in memory 120 after the rollback operation. Keeping third delta file 226 in memory 120 may allow ECU 112 to re-activate the third software update later if needed.

In some embodiments, server 102 may purposely push third delta file 226 into memory 120 as a way to prepare ECU 112 for a future update. Server 102 may, for example, instruct ECU 112 to temporarily bypass the startup code contained in third delta file 226 when third delta file 226 is pushed into memory 120. The link between second delta file 216 and software 204 of ECU 112 may therefore remain in place until such a time when server 102 instructs ECU 112 to execute the startup code contained in third delta file 226 (or in current software 204), which may then link third delta file 226 to software 204 of ECU 112 and complete the deployment of the third software update. It is contemplated that such an operation may be referred to as a roll forward, which may be utilized as a technique to coordinate the roll out of ECU software updates.

It is noted, however, that the number of delta files that can be stored in memory 120 may be limited due to its storage capacity. Therefore, in some embodiments, ECU 112 may be configured to identify specific contents stored in memory 120 for deletion when ECU 112 determines that the utilization of memory 120 is above a threshold (e.g., 75% or 90% full). In some embodiments, ECU 112 may identify contents for deletion based on their corresponding creation date, version number, file size, or the like. For example, an old delta file that has not been used for a long time may be a good candidate for deletion. In some embodiments, ECU 112 may also choose to replace its memory content entirely. For example, instead of keeping its original software plus multiple delta files received over the years, ECU 112 may decide to erase the entire content of memory 120 and replace it with a clean copy of the most recent ECU software. ECU 112 may continue to use the delta file-based update process described above for future updates.

Referring now generally to FIG. 1A. It is noted that while the descriptions above provided various examples illustrating efficient techniques for server 102 to provide software updates to vehicles 104 via communication channel 106, vehicles 104 may also utilize communication channel 106 to provide information to server 102 to further enhance the software update process.

For example, in some embodiments, vehicle 104-b may include at least one processor 114 coupled with at least one non-transitory processor-readable memory 116 configured for storing processor-executable code. When the processor-executable code is executed by processor 114, processor 114 may carry out instructions to monitor real-time processing activities of ECU 112 and identify ECU anomalies. In some embodiments, processor 114 may provide information regarding ECU anomalies to server 102 and/or other vehicles 104.

For illustrative purposes, a processor 114 configured to monitor real-time processing activities of ECU 112 and provide information regarding ECU anomalies to server 102 and/or other vehicles 104 may be referred to as an orchestrator 114. In some embodiments, orchestrator 114 may be implemented as a unit separated from ECU 112. However, it is contemplated that orchestrator 114 and ECU 112 may share certain hardware component without departing from the spirit and scope of the present disclosure. In additional embodiments, orchestrator 114 may be configured to perform machine learning or artificial intelligence functions (e.g., based on data from ECUs, from ECUs in fleets of vehicles, etc.), as discussed further below.

In some embodiments, orchestrator 114 may be configured to access historical data relating to processing activity of ECU 112. In some embodiments, the historical data may be logged in memory 116 previously by ECU 112 or by orchestrator 114. The historical data may represent expected processing activity of ECU 112. Orchestrator 114 may compare the real-time processing activity data with the historical data to identify one or more anomalies in the real-time processing activity of ECU 112. In some embodiments, orchestrator 114 may implement various types of statistical models to carry out the comparison. In some embodiments, orchestrator 114 may implement various types of data processing techniques, including machine learning techniques, to identify the anomalies.

In some embodiments, orchestrator 114 may be configured to report its findings to server 102 (e.g., via communication channel 106). Alternatively or additionally, in some embodiments, orchestrator 114 may implement one or more control actions for ECU 112 when it identifies one or more anomalies. The control action may include, for example, issuing an alert associated with ECU 112, blocking an instruction sent from ECU 112, or issuing a prompt to ECU 112 and requesting ECU 112 to adjust from executing one version of ECU software to another (e.g., roll back a version of ECU software running on the ECU to a prior version of ECU software).

It is contemplated that orchestrator 114 configured in accordance with disclosed embodiments may be able to detect various types of anomalies. For example, in some embodiments, the detected anomalies may correspond to specific memory locations used by ECU 112. If ECU 112 attempts to access a memory location outside of the specific memory locations, orchestrator 114 may identify such an activity as an anomaly. In some embodiments, the detected anomalies may correspond to specific sequences of memory locations used by ECU 112. If ECU 112 attempts to access memory locations in an order that is incompatible with the specific sequences, orchestrator 114 may identify such an activity as an anomaly. In some embodiments, the detected anomalies may correspond to at least one peak in data flow in or out of ECU 112. If data flowing in or out of ECU 112 is abnormally high, orchestrator 114 may report an anomaly. In some embodiments, the detected anomalies may correspond to at least one peak in data processing by one or more processors of ECU 112. If data processing by one or more processors of ECU 112 is abnormally high, orchestrator 114 may report an anomaly. In some embodiments, the detected anomalies may correspond to at least one anomaly in power consumption of ECU 112. If power consumption of ECU 112 is abnormally high, orchestrator 114 may report an anomaly.

In some embodiments, orchestrator 114 may be configured to monitor other ECUs in addition to ECU 112. In some embodiments, orchestrator 114 may be configured to monitor real-time processing activities of multiple ECUs in vehicle 104-b. For example, in some embodiments, orchestrator 114 may be configured to receive comparable data relating to processing activities of at least one other ECU 118 deemed comparable to ECU 112.

It is contemplated that ECU 118 and ECU 112 may be deemed comparable by their manufacturers or developers. ECU 118 and ECU 112 may also be deemed comparable based on their control functions and/or rules associated with ECU software running on ECU 118 and ECU 112. For example, if ECU 118 and ECU 112 have established that their corresponding sequences of execution are sufficiently similar, ECU 118 and ECU 112 may be deemed comparable. In another example, if ECU 118 and ECU 112 both suffer from similar malicious sequences of executions, ECU 118 and ECU 112 may be deemed comparable. In yet another example, if the map files of ECU 118 and ECU 112 are sufficiently similar, ECU 118 and ECU 112 may be deemed comparable. In still another example, orchestrator 114 may communicate with processors located on other vehicles 104 (e.g., via communication channel 106) to observe which ECUs the other vehicles 104 may consider to be comparable. Orchestrator 114 may then determine which ECUs located in vehicle 104-b may be considered comparable based on its observation of other vehicles 104.

In some embodiments, orchestrator 114 may be configured to compare real-time processing activity data received from ECU 112 with the comparable data received from ECU 118 to identify one or more anomalies in the real-time processing activity of ECU 112. In some embodiments, the comparable data received from ECU 118 may represent real-time processing activity data received from ECU 118. Alternatively or additionally, in some embodiments, the comparable data received from ECU 118 may include previously recorded activity data obtained from ECU 118.

In some embodiments, orchestrator 114 may implement various types of statistical models to carry out the comparison between the real-time processing activity data received from ECU 112 and the comparable data received from ECU 118. In some embodiments, orchestrator 114 may implement various types of data processing techniques, including machine learning techniques, to identify anomalies. In some embodiments, orchestrator 114 may be configured to report its findings to server 102. Alternatively or additionally, in some embodiments, orchestrator 114 may implement one or more control actions for ECU 112 when it identifies one or more anomalies.

In some embodiments, orchestrator 114 may be configured to electronically poll ECUs in vehicle 104-b to determine if the ECUs are properly responding to the poll. Orchestrator 114 may then identify one or more ECU errors or faults associated with one or more ECUs in vehicle 104-b. An example of a fault may be an ECU performing an operation a different number of times per time interval than expected or allowed. If an ECU error or fault is identified, orchestrator 114 may also collect data related to the operation of the ECU and the identified ECU error. Orchestrator 114 may send a report from vehicle 104-b to server 102 identifying the ECU and the identified ECU error. Server 102 may utilize the report for various purposes, including identification of errors and development of bug fixes.

It is to be understood that while the term "orchestrator" is used in the example above, the term is not meant to be limiting. It is contemplated that an orchestrator may be configured to electronically poll ECUs in vehicles to determine if the ECUs are properly responding to a poll. In addition, the orchestrator 114 may utilize machine learning or artificial intelligence techniques to determine if ECUs are properly operating (e.g., are operating within acceptable or expected behavioral envelopes). For example, the orchestrator 114 may be configured to monitor the top functionalities (e.g., top 10 or 100 functionalities) in an ECU (or multiple ECUs), and develop a model or map of observed functioning. When a deviation from this model or map is detected, an anomaly may be declared. In some embodiments, orchestrator 114 may be implemented as a particular ECU (e.g., ECU 112 in FIG. 1), while other ECUs are configured to report (e.g., via push or pull) data to the orchestrator 114 ECU. In this way, the orchestrator 114 ECU may gather data to be used in machine learning or artificial intelligence regarding the observed and expected functionality of other ECUs.

In some embodiments, the orchestrator 114 may participate in a predictive maintenance or self-healing process for ECUs in a vehicle. Such approaches may be based on a distributed, artificial immune system (AIS) framework. In particular, ECUs throughout a vehicle may be configured to report (e.g., via push or pull) data regarding their operations and functionality to orchestrator 114 (or another AIS-configured ECU) for machine learning and artificial intelligence. The orchestrator 114 (or another AIS-configured ECU) may perform algorithms on the received data to detect software anomalies, errors (e.g., runtime errors), and faults (e.g., drifting). Such an architecture may be efficient and low impact, since it distributes ECU reporting broadly among many ECUs, and is still capable of tracking many different parameters of ECU performance. Further, the orchestrator 114 (or another AIS-configured ECU) may perform the analysis autonomously and adaptively, reflecting the continuously changing nature of ECU operations within the vehicle. Based on the machine learning or artificial intelligent functions of orchestrator 114 (or another AIS-configured ECU), recommended changes may be suggested or automatically implemented to maintain the health of the vehicle's ECUs (e.g., performing a software roll-back, performing a software update, etc.). In some embodiments, the machine learning or artificial intelligence functions are performed at a server (e.g., server 102), and may provide recommended changes for entire fleets of vehicles (e.g., those sharing similar ECUs, similar software versions, etc.).

The system architecture for orchestrator 114 (or another AIS-configured ECU) may be multi-tiered. In some embodiments, the orchestrator 114 or server 102 serves as a central node, and individual ECUs that report operational or functional data to it are child or edge nodes. A first tier (e.g., Tier 1) may perform low-profile monitoring of ECU behavior. For example, this may involve applying machine learning models or artificial intelligence algorithms to analyze the activity of individual ECUs or groups of ECUs. This may account for ECU memory footprints, CPU processing activity, functions called, sequences of functions called, etc.). A second tier (e.g., Tier 2) may operate on an on-demand basis. For example, if the machine learning or artificial intelligence tier detects a potential anomaly in the operational behavior of an ECU, Tier 2 may be reached, which may involve further analysis of the ECU in question (e.g., a memory stack analysis, reporting information regarding the ECU anomaly to the orchestrator 114 or server 102, etc.). Similarly, in a third tier of operations (e.g., Tier 3), samples of the ECU operations (e.g., the memory locations being called, software version, delta file version, copy of the software, etc.) may be transmitted back to orchestrator 114 or server 102 for further analysis. In a fourth tier of operations (e.g., Tier 4), a determination may be made to perform a control action for the ECU or group of ECUs at issue. This may include, for example, rolling the software back to a prior version (e.g., based on a delta file for the prior version), activating a safe mode for the ECU (e.g., blocking network communications, regulating functionality, etc.), or other forms of control for the ECUs.

It is to be understood that the orchestrator 114 may be implemented utilizing one or more processors 114 located in vehicle 104-b. In some embodiments, the orchestrator may be implemented on processor 114 or a separate processor in the vehicle. In some embodiments, the orchestrator may be implemented remotely (e.g., via server 102). For illustrative simplicity, the description below will reference a processor configured to electronically poll ECUs in vehicles to determine if the ECUs are properly responding to the poll, or perform machine learning or artificial intelligence functions, as an orchestrator.

In some embodiments, the orchestrator may poll an ECU in vehicle 104-b by sending a request message to the ECU and wait for the ECU to provide one or more response messages. The orchestrator may refer to, for example, the integrated hardware counter or monitor in a processor (e.g., ECU processor) that detects whether a program is continuing to run. The orchestrator may determine that an ECU has performed or caused an error or fault when a failure to respond to a poll is detected. As discussed above, errors and faults may include runtime errors, stack overflow errors, "drifting" of an application execution profile (e.g., becoming slower, faster, or occurring over a longer or shorter period), etc.

In some embodiments, the orchestrator may poll multiple ECUs in vehicle 104-b to determine whether the ECUs are executing ECU software that has a potential impact on one or more hardware components of vehicle 104-b. For example, if after updating ECU 112, multiple ECUs that interact with the transmission start to exhibit erroneous behaviors, the orchestrator may determine that the software update for ECU 112 has a potential impact on the transmission of vehicle 104-b. The orchestrator may also collect report data from the various ECUs (e.g., including ECU identifiers and/or data indicating a last-known poll of the ECUs) as well as report data from the various hardware components of vehicle 104-b (e.g., including the transmission). The orchestrator may also perform statistical analysis, machine learning, or artificial intelligence functions based on the reported data, as discussed further below.

In some embodiments, the orchestrator may determine whether the potential impact or anomaly in an ECU is detrimental. For example, if the orchestrator determines, based on the reported data, that the average temperature of the transmission during normal operations has increased by a few degrees, the orchestrator may determine that the potential impact to the transmission is detrimental. Alternatively or additionally, in some embodiments, the orchestrator may be configured to provide the reported data to server 102 and let server 102 (or its user) to determine whether the potential impact is detrimental.

In some embodiments, the orchestrator may determine a probability of downtime for the ECUs based on the reported data. The orchestrator may make this determination based on a statistical model or past behaviors, including the machine learning and artificial intelligence techniques discussed below. In some embodiments, the orchestrator may be configured to report its determination to server 102. In further embodiments, as discussed below, the orchestrator may implement one or more control actions for ECU 112 when it is determined that the potential impact is detrimental, or when the probability of downtime exceed a certain threshold.

Referring now generally to the vehicle network 100 shown in FIG. 1A. It is contemplated that some of the functionalities provided by the orchestrator described above may be carried out over network 106 in addition to (or instead of) being carried out by processors 114 located on vehicles 104. For example, in some embodiments, server 102 may be configured to receive ECU activity data from one or more reporting vehicles 104 via communication channel 106. In some embodiments, reporting vehicles 104 may include vehicles that are being monitored as a group. In some embodiments, the reporting vehicles may include a set of vehicles having a common type of ECU (e.g., if vehicles 104-a, 104-b, and 104-c all have the same type of ECU, vehicles 104-a, 104-b, and 104-c may be monitored as a group) or common software version.

In some embodiments, the ECU activity data may correspond to actual operations of one or more ECUs operating in the group of vehicles (e.g., vehicles 104-a, 104-b, and 104-c in the example above). In some embodiments, server 102 may be configured to determine, based on the ECU activity data, software vulnerabilities affecting vehicles 104-a, 104-b, and 104-c. In some embodiments, server 102 may implement various types of statistical models to determine software vulnerabilities based on ECU activity data. For example, in some embodiments, server 102 may determine software vulnerabilities based on a deviation between the received ECU activity data and expected (or historical) ECU activity data. In some embodiments, server 102 may implement various other types of data processing techniques, including machine learning techniques, to determine the software vulnerabilities.

In some embodiments, server 102 may be configured to identify an ECU software update if it is determined that there are software vulnerabilities affecting vehicles 104-a, 104-b, and 104-c. Server 102 may also generate and send a delta file configured to update software on the ECUs of the affected vehicles 104-a, 104-b, and 104-c. It is contemplated that server 102 may generate the delta file in accordance the processes described above. It is also contemplated that vehicles 104-a, 104-b, and 104-c may process the delta file and perform the ECU software update process as described above.

In some embodiments, server 102 may also be configured to determine a second set of vehicles potentially affected by the software vulnerabilities identified above. The second set of vehicles may include vehicles 104-d and 104-e that are not a part of the group of vehicles that initially reported the ECU activity data to server 102 (e.g., vehicles 104-d and 104-e may be unable to connect to server 102 at an earlier time), but may nevertheless contain ECUs that should be updated. Server 102 may identify such vehicles based on records of deployed ECU version numbers or based on inquiries made to these vehicles (e.g., server 102 may ask all vehicles 104 to report their ECU software version numbers, 3Diff versions, or other identifiers). In some embodiments, server 102 may be configured to send delta files to all vehicles that are using ECUs that should be updated. In some embodiments, server 102 may be configured to push delta files to all vehicles 104 as a way to recalibrate ECUs installed in vehicles 104.

It is contemplated that one or more processors 114 located on vehicles 104, upon receiving delta files from server 102, may place the delta files into the memory devices of the corresponding ECUs and perform the update without interrupting the operations of the ECUs. It is also contemplated, however, that in certain situations, one or more processors 114 located on a vehicle 104 may decide to perform the update opportunistically.

For example, in some embodiments, processor 114 located on vehicle 104-b may receive a wireless transmission indicating a need to update software running on ECU 112 in vehicle 104-b. Processor 114 may monitor an operational status of vehicle 104-b to determine whether vehicle 104-b is in a first mode of operation in which an ECU software update is prohibited. Vehicle 104-b may be in the first mode of operation when vehicle 104-b cannot establish a stable connection with server 102. Vehicle 104-b may also be in the first mode of operation when the wireless communications strength is below a threshold level. Furthermore, vehicle 104-b may be in the first mode of operation when vehicle is in a restricted area, or is performing certain operations (e.g., traveling at a speed above a threshold). It is to be understood that the examples presented above are for illustrative purposes and are not meant to limiting. It is contemplated that vehicle 104-b may be in the first mode of operation due to various other reasons without departing from the spirit and scope of the present disclosure.

In some embodiments, if processor 114 determines that vehicle 104-b is in the first mode of operation, processor 114 may choose to delay the ECU software update process. In some embodiments, processor 114 may store the received delta file in memory 116. In some embodiments, processor 114 may discard the delta file (which can be requested later when processor 114 is ready to install the ECU software update).

Processor 114 may continue to monitor the operational status of vehicle 104-*b* to determine whether vehicle 104-*b* transitions into a second mode of operation in which the ECU software update is permitted. In some embodiments, processor 114 may continue to monitor the operational status of vehicle 104-*b* repeatedly according to a preestablished interval (e.g., every 10 minutes). Processor 114 may determine that vehicle 104-*b* is in the second mode of operation when, for example, vehicle 104-*b* enters one of the predetermined safe operating conditions, such as traveling at a speed below a threshold level, operating a low-power or a power-down status, operating in a preselected environmental condition, idling, or the like. Processor 114 may also determine that vehicle 104-*b* is in the second mode of operation when vehicle 104-*b* can establish a stable connection with server 102. For example, processor 114 may determine that vehicle 104-*b* is in the second mode of operation when the wireless communications strength reaches above a threshold of strength or the network connection with server 102 has an error rate below a threshold.

Once processor 114 determines that vehicle 104-*b* is in the second mode of operation, processor 114 may enable the ECU software update process, which may proceed as described above. If processor 114 stored a copy of the received delta file in memory 116 when it decided to delay the ECU software update process, processor 114 may retrieve the copy of the received delta file from memory 116 and write the delta file into memory 120 of ECU 112. If processor 114 discarded the delta file when it decided to delay the ECU software update process, processor 114 may send a message to server 102 to request another copy of the delta file. Processor 114 may receive the delta file in a reply message from server 102 and write the delta file into memory 120 of ECU 112 and perform the update process as described above.

It is to be understood that while processor 114 may have some discretion regarding delay of the ECU software update process, such a discretion may not be absolute in some embodiments. For example, in some embodiments, processor 114 may receive a wireless transmission from server 102 that indicates the ECU software update is to be performed with an override status. If the ECU software update is received with an override states, processor 114 may not be able to exercise its discretion and may have to update the ECU software regardless of whether vehicle 104-*b* is in the first mode of operation. It is contemplated that such an update with override status may be utilized to deploy critical ECU updates immediately without delay.

Similarly, as previously described, an ECU software update process utilizing delta files configured in accordance with disclosed embodiments may allow the ECUs to be updated without having to reboot. In some embodiments, however, server 102 may indicate that a given ECU software update is to be performed with a mandatory reboot. If the ECU software update is received with a request to reboot, processor 114 may instruct the ECU to perform the update as describe above followed by a mandatory reboot.

It will be appreciated from the descriptions above that utilizing delta files configured in accordance with disclosed embodiments may improve the efficiencies of ECU update processes. These delta files are smaller in size because them don't need to include the entire ECU software. These delta files can also be written directly to ECU memory spaces, which may reduce both memory space and power consumptions. These delta files may also be implemented as self-contained packages that include code changes, variable changes, and memory address changes. These delta files may further contain startup code that can be executed by the ECUs, allowing the delta files to be position-independent and allowing the ECUs to carry out the update without having to change their original software or interrupting their current operations.

The virtual file system (VFS) configured in accordance with disclosed embodiments may also improve the efficiencies of ECU update processes. The VFS may be utilized to manage and track different versions of the ECU software, and may support update as well as roll back operations described above. Moreover, it is noted that using the VFS configured in accordance with disclosed embodiments to manage and track different versions of the ECU software may require very little space overhead because only the differences (deltas) between the versions need to be tracked and no duplicated code need to be recorded.

Furthermore, it is noted that utilizing delta files managed by the VFS configured in accordance with disclosed embodiments may eliminate the need to restart the ECUs after the update. Specifically, delta files configured in accordance with disclosed embodiments may implement code changes, variable changes, and memory address changes all at once, effectively linking the original ECU software and the delta files together to form a functional equivalent of the updated ECU software without the need for a reboot.

It is contemplated the ECU software update process configured in accordance with disclosed embodiments may also be utilized to update virtual ECUs. A virtual ECU may refer to an ECU that is implemented on a virtual machine or a hypervisor residing on a shared hardware resource. It is contemplated that substantially the same ECU software update process may be utilized to update a virtual ECU software without departing from the spirit and scope of the present disclosure.

Referring now to FIG. 10, an exemplary flowchart showing a process 1000 for generating an update package for updating software on an ECU in a vehicle is shown. In accordance with above embodiments, process 1000 may be implemented in system 100 depicted in FIG. 1A. For example, process 1000 may be performed by server 102. As discussed above, the update package (e.g., based on software attributes such as source, map, binaries) may be obtained from the production toolchain 122. Further, in connection with generating the update package, reference may be made to dependency management system 126. In particular, dependency management system 126 may be checked to determine if the new update package is associated with an ECU that is interdependent with other ECUs in a vehicle, and if so, whether software updates should also be performed for the interdependent ECUs. As discussed above, dependency management system 126 may maintain lists or mappings of ECUs, so that interdependencies between ECUs can be confirmed before software updates are performed. In some embodiments, the lists or mappings are also based on production toolchain 122.

At step 1002, process 1000 may access multiple attributes of a software update (e.g., software update 202 shown in FIG. 2) to be stored on an ECU in a vehicle (e.g., ECU 112 in vehicle 104-*b*). At step 1004, process 1000 may access multiple corresponding of attributes of the current software stored on the ECU in the vehicle (e.g., current software 204 stored on ECU 112 in vehicle 104-*b*). At step 1006, process 1000 may compare the attributes of the software update with the corresponding attributes of the current software. At step 1008, process 1000 may generate a delta file representing differences between the attributes of the software update and the corresponding attributes of the current software. At step

1010, process 1000 may integrate startup code into the delta file. In some embodiments, the startup code may enable the delta file to self-execute in the ECU in the vehicle.

In some embodiments, at step 1006, process 1000 may compare attributes including the source, the binary code, and the map file of the software update with their corresponding attributes of current software. As discussed above, representing the software update and the current software in terms of their source, binary code, and map file attributes may be referred to as a "grid" representation, and a comparison between a grid representing the software update and a grid representing the current software may be referred to as a three-dimensional differential (or 3Diff) comparison. In some embodiments, the attributes being compared may be identified at least partially based on the programming language used to develop the software update, at least partially based on a binary file resolution of the software update, or at least partially based on a map file associated with the software update.

In some embodiments, at step 1008, process 1000 may utilize such a 3Diff comparison to produce a delta file that may include data representing changes made to the binary and/or the source code of the ECU, changes made to one or more variables used by the ECU, and changes made to memory addresses referenced by the ECU. For example, in some embodiments, at step 1008-1, process 1000 may apply a first grid to the software update, and, at step 1008-2, process 1000 may apply a second grid to the current software stored on the ECU. The first grid may represent the software update in one or more dimensions, including binary data associated with the software update, a source attribute associated with the software update, and/or a map file associated with the software update. At step 1008-3, process 1000 may identify the attributes of the software update and the corresponding attributes of the current software based on a comparison of the first and second grids.

In some embodiments, at step 1010, process 1000 may integrate the startup code configured to initialize a runtime library of delta file. In some embodiments, process 1000 may configure the startup code to update a program counter of the ECU to skip certain code contained in the current software and execute certain code contained in the delta file instead. The startup code may determine if old contents of the memory in the ECU need to be erased. Further, the startup code may extract the variable data from the delta file and place the variable data into a random-access memory accessible to the ECU. In some embodiments, the startup code may extract the code for updating memory addresses and update the memory addresses in the ECU.

Referring now to FIG. 11, an exemplary flowchart showing a process 1100 for receiving and integrating a delta file in a vehicle shown. In accordance with above embodiments, process 1100 may be implemented in system 100 depicted in FIG. 1A. For example, process 1100 may be performed by ECU 112 in vehicle 104-b.

At step 1102, process 1100 may receive a delta file (e.g., delta file 206) comprising a plurality of deltas (or changes) corresponding to a software update for software on the ECU (e.g., ECU 112) and startup code (e.g., startup code 208) for executing the delta file in the ECU. At step 1104, process 1100 may execute the delta file, based on the startup code, in the ECU. In some embodiments, the startup code may be configured in accordance with above embodiments, and at step 1106, process 1100 may update memory addresses in the ECU to correspond to the plurality of deltas from the delta file.

In some embodiments, the delta file may be written to a memory device (e.g., memory device 120 as depicted in FIG. 1A) associated with the ECU. In some embodiments, the delta file may be bootstrapped from the memory device to a random access memory associated with the ECU. Further, the delta file may be executable by the ECU without affecting continued operations of the ECU, or without rebooting the ECU.

In some embodiments, the delta file may include position-independent executable code segments (e.g., code changes 210 as depicted in FIG. 4) to be executed by the ECU. The startup code may be configured to update a program counter of the ECU to execute instructions contained in the delta file, as depicted in FIG. 4.

In some embodiments, the software on the ECU may be mapped to multiple functional units and the ECU may be configured to utilize a virtual file system (e.g., VFS 230, as depicted in FIG. 5-8) to manage and track one or more versions these functional units, as depicted in FIG. 5-8. The startup code may be configured to link the delta file to a specific function in the VFS associated with the delta file, as depicted in FIG. 5-8.

Referring now to FIG. 12, an exemplary flowchart showing a process 1200 for performing updates to ECU software while an ECU of a vehicle is operating is shown. In accordance with above embodiments, process 1200 may be implemented in system 100 depicted in FIG. 1A. For example, process 1200 may be performed by ECU 112 in vehicle 104-b.

At step 1202, process 1200 may receive a software update file for the ECU software (e.g., delta file 206) while the ECU of the vehicle (e.g., ECU 112 of vehicle 104-b) is operating. At step 1204, while the ECU is still operating, process 1200 may write the software update file into a first memory location (e.g., the memory location where delta file 206 is stored in FIG. 4) in a memory (e.g., memory 120) of the ECU while simultaneously executing a code segment of existing code in a second memory location (e.g., the memory location where the current software 204 is stored in FIG. 4) in the memory of the ECU. At step 1206, process 1200 may update a plurality of memory addresses associated with the memory of the ECU based on the software update file and without interrupting the execution of the code segment currently being executed in the second memory location in the memory of the ECU.

In some embodiments, the software update file for the ECU software may include a delta file with integrated startup code as described above. Process 1200 may, for example, initialize the runtime library before writing the software update file into the first memory location of the ECU. In some embodiments, process 1200 may be configured to delete, at step 1208, data representing outdated values of variables referenced by the ECU upon completion the software update. Further, process 1200 may be further configured to defragment, at step 1210, the memory (e.g., memory 120) of the ECU after completing the software update or independent of the software update (e.g., periodically or as needed).

Referring now to FIG. 13, an exemplary flowchart showing a process 1300 for adjusting vehicle ECU software versions is shown. In accordance with above embodiments, process 1300 may be implemented in system 100 depicted in FIG. 1A. For example, process 1300 may be performed by ECU 112 in vehicle 104-b.

At step 1302, process 1300 may receive a prompt to adjust the ECU of the vehicle (e.g., ECU 112 of vehicle 104-b) from executing a first version of ECU software (e.g., Version 0 depicted in FIG. 5) to a second version of ECU software (e.g., Version 1 depicted in FIG. 5). At step 1304, process 1300 may configure, in response to the prompt and based on a delta file (e.g., delta file 206 depicted in FIG. 5) corresponding to the second version of ECU software, the second version of ECU software on the ECU in the vehicle for execution. At step 1306, process 1300 may further configure, in response to the prompt, the first version of ECU software on the ECU in the vehicle to become non-executable.

In some embodiments, the second version of ECU software may be deployed subsequent to the first version of ECU software (e.g., as depicted in FIGS. 5-7, and FIG. 9, T1-T3). Alternatively, the second version of ECU software may be deployed prior to the first version of ECU software (e.g., as depicted in FIG. 8 and FIG. 9, T4).

In some embodiments, the ECU software on the ECU is mapped to multiple functional units and the ECU is configured to utilize a virtual file system (e.g., VFS 230) to manage and track one or more versions of these functional units. At step 1306, process 1300 may update memory addresses in the ECU corresponding to one or more functional units managed by the VFS to make the first version of ECU software non-executable. Further, the second version of ECU software may be the first version of ECU software having one or more functional units disabled by the VFS.

In some embodiments, process 1300 may determine, at step 1308, that utilization of the memory (e.g., memory 120) of the ECU is above a threshold (e.g., 75% or 90% full). Process 1300 may also identify, at step 1310, specific contents of the memory of the ECU for deletion. In addition, process 1300 may identify contents for deletion based on their corresponding creation date, version number, file size, or the like. For example, an old delta file that has not been used for a long time (e.g., threshold amount of time) may be a good candidate for deletion. In some embodiments, process 1300 may also choose to replace the entire content of the memory of the ECU. For example, instead of keeping the original software plus multiple delta files received over the years, process 1300 may decide, at step 1312, to erase the entire content of the memory and replace it with a clean copy of the most recent ECU software. Process 1300 may continue to use the delta file-based update process described above for future updates.

Referring now to FIG. 14, an exemplary flowchart showing a process 1400 for identifying ECU anomalies in a vehicle is shown. In accordance with above embodiments, process 1400 may be implemented in system 100 depicted in FIG. 1A. For example, process 1400 may be performed by a controller in the vehicle (e.g., a processor 114 in vehicle 104-*b*).

At step 1402, process 1400 may monitor data representing real-time processing activity of an ECU (e.g., ECU 112). At step 1404, process 1400 may access historical data relating to processing activity of the ECU. In some embodiments, the historical data may represent expected processing activity of the ECU. Further, process 1400 may monitor operations of the ECU to generate the historical data.

At step 1406, process 1400 may compare the real-time processing activity data with the historical data to identify one or more anomalies in the real-time processing activity of the ECU. In some embodiments, the anomalies may correspond to specific memory locations used by the ECU. Further, the anomalies may correspond to specific sequences of memory locations used by the ECU. The anomalies may correspond to at least one peak in data flow in or out of the ECU. Further, the anomalies may correspond to at least one peak in data processing by a processor of the ECU. In addition, the anomalies may correspond to at least one anomaly in power consumption of the ECU.

At step 1408, process 1400 may implement a control action for the ECU when the at least one anomaly is identified. In some embodiments, the control action may include issuing a prompt to adjust the ECU from executing a first version of ECU software to a second version of ECU software (e.g., rolling back a version of ECU software running on the ECU to a prior version of ECU software). The control action also may include sending an alert associated with the ECU. Further, the control action may include blocking an instruction sent from the ECU.

In some embodiments, process 1400 may be carried out by an orchestrator in the vehicle (e.g., orchestrator 114, as described above). In some embodiments, the orchestrator may be a separate processing unit from the ECU. The orchestrator may be configured to perform the monitoring, accessing, comparing, and implementing for multiple ECUs (e.g., both ECU 112 and ECU 118) in the vehicle.

Referring now to FIG. 15, an exemplary flowchart showing a process 1500 for identifying ECU anomalies in a vehicle is shown. In accordance with above embodiments, process 1500 may be implemented in system 100 depicted in FIG. 1A. For example, process 1500 may be performed by a controller in the vehicle (e.g., a processor 114 in vehicle 104-*b*).

At step 1502, process 1500 may monitor data representing real-time processing activity of an ECU (e.g., ECU 112). At step 1504, process 1500 may receive comparable data relating to processing activity of at least one other ECU deemed comparable in functionality to the ECU. As previously described, in some embodiments, comparable data may include data obtained in real-time relating to processing activity of other ECUs (e.g., ECU 118) deemed comparable to the ECU (e.g., ECU 112). Comparable data may include data previously gathered relating to processing activity of other ECUs deemed comparable to the ECU. In some embodiments, comparable data may be obtained based on rules associated with ECU software running on the ECU. Further, comparable data may be obtained based on known valid sequences of execution of ECU software running on the ECU. In some embodiments, comparable data may be obtained based on known potentially malicious sequences of execution of ECU software running on the ECU. In some embodiments, comparable data may be obtained based on a map file associated with ECU software on the ECU. Comparable data may also be obtained based on observational data received from other vehicles.

At step 1504, process 1500 may compare the real-time processing activity data with the comparable data to identity one or more anomalies in the real-time processing activity of the ECU. In some embodiments, the anomalies may correspond to specific memory locations used by the ECU. In some embodiments, the anomalies may correspond to specific sequences of memory locations used by the ECU. In some embodiments, the anomalies may correspond to at least one peak in data flow in or out of the ECU. The anomalies may correspond to at least one peak in data processing by a processor of the ECU. The anomalies may also correspond to at least one anomaly in power consumption of the ECU.

At step 1506, process 1500 may implement a control action for the ECU when the at least one anomaly is identified. In some embodiments, the control action may include issuing a prompt to adjust the ECU from executing a first version of ECU software to a second version of ECU software (e.g., rolling back a version of ECU software running on the ECU to a prior version of ECU software). The control action may also include sending an alert associated with the ECU. Further, the control action may include blocking an instruction sent from the ECU.

Referring now to FIG. 16, an exemplary flowchart showing a process 1600 for opportunistically updating ECU software in a vehicle is shown. In accordance with above embodiments, process 1600 may be implemented in system 100 depicted in FIG. 1A. For example, process 1600 may be performed by a controller in the vehicle (e.g., a processor 114 in vehicle 104-b).

At step 1602, process 1600 may include receiving a wireless transmission indicating a need to update software running on an ECU (e.g., ECU 112). At step 1604, process 1600 may monitor an operational status of the vehicle to determine whether the vehicle is in a first mode of operation in which an ECU software update is prohibited.

At step 1606, process 1600 may delay the ECU software update when the operational status is prohibited. Process 1600 may store the ECU software update in a memory located on the vehicle for delayed update when the vehicle is in the first mode of operation. Alternatively, in some embodiments, process 1600 may discard the ECU software update when the vehicle is in the first mode of operation (process 1600 may request the ECU software update at a later time).

At step 1608, process 1600 may continue to monitor the operational status of the vehicle to determine whether the vehicle is in a second mode of operation in which the ECU software update is permitted. Process 1600 may repeatedly monitor the operational status of the vehicle according to a preestablished interval. In some embodiments, the vehicle may be determined to be in the second mode of operation when the vehicle is operating in a predetermined safe operating condition. In some embodiments, the vehicle may be determined to be in the second mode of operation when the vehicle is in a power-down or an idling status. The vehicle may be determined to be in the second mode of operation when the vehicle has had a period of wireless communications strength above a threshold of strength. In some embodiments, the vehicle may be determined to be in the second mode of operation when the vehicle is operating in a preselected environmental condition. In some embodiments, the vehicle may be determined to be in the second mode of operation when the vehicle has a network connection with an error rate below a threshold.

At step 1610, process 1600 may enable updating of the ECU with the delayed ECU software update when it is determined that the vehicle is in the second mode of operation. If process 1600 stored a copy of the ECU software update in a memory located on the vehicle, process 1600 may retrieve the copy of the ECU software update from the memory and proceed with the update process. If process 1600 discarded the ECU software update when the vehicle is in the first mode of operation, process 116 may send a message to a remote server that can provide a copy of the ECU software update, receive the ECU software update in reply, and install the ECU software update on the ECU when the vehicle is in the second mode of operation.

In some embodiments, process 1600 may determine, at step 1612, whether the wireless transmission indicating the need to update the software includes an indication of that the update is with an override status. If the wireless transmission includes an indication that update is with an override status, process 1600 may update the ECU software immediately, at step 1614, regardless of whether the vehicle is in the first mode of operation.

Referring now to FIG. 17, an exemplary flowchart showing a process 1700 for automatically providing updates to one or more vehicles is shown. In accordance with above embodiments, process 1700 may be implemented in system 100 depicted in FIG. 1A. For example, process 1700 may be performed by server 102.

At step 1702, process 1700 may receive ECU activity data from a vehicle (e.g., activity date of ECU 112 in vehicle 104-b). In some embodiments, the ECU activity data may correspond to actual operation of the ECU in the vehicle.

At step 1704, process 1700 may determine, based on the ECU activity data, a software vulnerability affecting the vehicle. In some embodiments, the software vulnerability may be determined based on a deviation between the received ECU activity data and expected ECU activity data.

At step 1706, process 1700 may identify an ECU software update based on the determined software vulnerability. At step 1708, process 1700 may sending a delta file configured to update software on the ECU with a software update corresponding to the identified ECU software update.

In some embodiments, process 1700 may be performed on a group of vehicles. In some embodiments, the group of vehicles may include a first set of vehicles (e.g., vehicles 104-a, 104-b, and 104-c) having a common ECU type. In some embodiments, process 1700 may determine the software vulnerability by determining a software vulnerability that affects the first set of vehicles.

In some embodiments, process 1700 may determine, at step 1710, a second set of vehicles potentially affected by the software vulnerability. In some embodiments, process 1700 may send delta files to both the first set and the second set of vehicles at step 1712. Further, the delta files may include an installation agent (e.g., startup code as previously described) for installing the ECU software update on the ECU. In addition, the delta files may be configured to recalibrate ECUs in multiple vehicles. Process 1700 may also include instructing the ECUs of the vehicles to reboot in response to the ECU software update.

Referring now to FIG. 18, an exemplary flowchart showing a process 1800 for reporting ECU errors to a remote monitoring server is shown. In accordance with above embodiments, process 1800 may be implemented in system 100 depicted in FIG. 1A. For example, process 1800 may be performed by a processor in a communications network of a vehicle (e.g., a processor 114 in vehicle 104-b) or by server 102.

At step 1802, process 1800 may receive data from an orchestrator within the vehicle. The orchestrator may be configured to electronically poll a plurality of ECUs in the vehicle (e.g., ECUs 112 and 118 in vehicle 104-b) and determine if they are properly responding to the poll. In some embodiments, the data may be received directly from the ECUs (i.e., without a separate orchestrator). Further, as discussed above, the orchestrator may be configured to perform one or more machine learning or artificial intelligence functions to the reported data from the ECUs, to determine whether the ECUs are operating within an allowed or expected envelope of operational attributes (e.g., CPU processing, memory contents, memory accessing patterns, driver behavior attributes, etc.).

At step 1804, process 1800 involve generating a statistical model of the operational data based on one or more runtime attributes. As discussed above, this may be part of a first tier of a multi-tier model for the ECUs. The statistical model may be based on multivariate or univariate time series analysis, and may factor in attributes such as CPU or memory usage, memory sequences being accessed, cache contents or accessing history, page faults, etc. The statistical model may further be based on a correlation of running processes at a footprint of memory at a discrete time slice. In addition, the statistical model may be based on a frequency or execution path of software running on the ECU (e.g., based on the VFS). Further, the statistical model may be based on driver behavioral attributes (e.g., sharp or soft breaking, acceleration, or turning, or frequency of breaking, acceleration, or turning, etc.). In addition, the statistical model may account for OBD messages, such as OBD error messages.

At step 1806, process 1800 involve receiving live, runtime updates from the one or more ECUs being monitored. As discussed above, this may be based on a push or pull function. The data from the ECUs may be obtained by an orchestrator in the vehicle or a remote server (e.g., server 102).

At step 1808, process 1800 may involve identifying an ECU error associated with an ECU based on the received data. In some embodiments, the ECU error is determined by comparing the statistical model (as described above) to the live, runtime updates from the ECUs. In some embodiments, the collected data may include identifiers of the ECUs. The collected data may include data indicating a last-known poll of the ECUs. In some embodiments, process 1800 may determine a probability of downtime for the ECUs based on the collected data. At step 1808, process 1800 may wirelessly send a report (identifying the ECU and the identified ECU error) from the vehicle to the remote monitoring server (e.g., server 102) based on the collected data.

In some embodiments, process 1800 may poll the ECUs by sending a request message to the ECUs and determine if the ECUs are properly responding to the poll. In some embodiments, process 1800 may identify ECU errors based on an ECU failing to respond to the poll. Process 1800 may also identify ECU errors based on an ECU incorrectly responding to the poll. In some embodiments, process 1800 may identify ECU errors based on a detected stack overflow in an ECU.

In some embodiments, process 1800 may poll the ECUs to determine whether the ECUs are executing ECU software that has a potential impact on one or more hardware components of the vehicle. Process 1800 may determine whether the ECUs are executing ECU software that has a potential impact based on one or more statistical analysis performed on data reported by the one or more hardware components of the vehicle.

In step 1810, process 1800 may further involve wirelessly sending a report from the vehicle to a server (e.g., server 102) identifying the ECU and the ECU error that has been detected. Subsequently, server 102 may perform further analysis on the ECU and error that was identified. In some embodiments, server 102 may further receive samples of the runtime data collected from the ECU, an identification of a delta file running at the ECU, a software version of the ECU, or actual contents of the ECU memory, etc.

Process 1800 may also, at step 1812, determine whether the potential impact is detrimental. In such a situation, at step 18134, a control action may be implemented for the ECU. For example, the ECU may be adjusted using the delta-file-based software update process described above. Further, the ECU may be instructed to perform a roll-back to a prior version of ECU software or perform an update to a new version of ECU software. In addition, in some embodiments the control action may include placing the ECU in a safe mode of operation with certain functions (e.g., network communications, memory modification, etc.) are limited.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present disclosure. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for providing software changes, comprising:
   identifying a software vulnerability of a controller, wherein:
      the software vulnerability is identified based on a deviation of first activity data from an allowed envelope of at least one operational attribute; and
      the allowed envelope is based on second activity data received from a plurality of controllers;
   determining a controller software change based on the identified software vulnerability, the controller software change being configured to adjust the controller from executing a first version of controller software to a second version of controller software; and
   sending, to the controller and based on the determining, a delta file configured to:
      execute the controller software change on the controller to link execution of current code stored on the controller with execution of a segment of code from the delta file;

update a program counter of the controller to execute an instruction from the delta file without erasing existing content of a memory component of the controller; and extract code for updating memory addresses in the controller and update the memory addresses in the controller.

2. The non-transitory computer readable medium of claim 1, wherein the linked execution of the current code and the segment of code from the delta file form a functional equivalent of a software update that is operable prior to rebooting the controller.

3. The non-transitory computer readable medium of claim 1, wherein the delta file comprises position-independent code or is multidimensional.

4. The non-transitory computer readable medium of claim 1, wherein the operational attribute is associated with processor activity or memory content.

5. The non-transitory computer readable medium of claim 1, wherein the allowed envelope comprises a threshold number of executions of a function within a time interval.

6. The non-transitory computer readable medium of claim 1, wherein the second version of controller software was deployed prior to the first version of controller software.

7. The non-transitory computer readable medium of claim 1, wherein the controller is a first controller of a first device and the operations further comprise:

determining a second controller of a second device; and
sending a second delta file to the second controller, the second delta file corresponding to the delta file.

8. The non-transitory computer readable medium of claim 7, wherein the first controller is monitored as part of a first group and the second controller is monitored as part of a second group.

9. The non-transitory computer readable medium of claim 8, the operations further comprising identifying the second controller to be similar to the first controller, wherein the delta file is sent to the second controller based on the identified similarity.

10. The non-transitory computer readable medium of claim 1, wherein the allowed envelope is based on a statistical model based on at least one of: an amount of processor usage, an amount of memory usage, a memory sequence accessed, cache content history, cache access history, a page fault, a correlation of processes at a footprint of memory at a discrete time slice, a frequency of an execution, an execution path, or an on-board diagnostic (OBD) message.

11. The non-transitory computer readable medium of claim 1, wherein the second version of controller software is the first version of controller software having one or more functional units disabled.

12. The non-transitory computer readable medium of claim 1, wherein the delta file is further configured to cause the first version of controller software on the controller to become non-executable.

13. The non-transitory computer readable medium of claim 1, the operations further comprising determining the first version of controller software by examining a record of a software version previously deployed to the controller.

14. A method for performing operations for automatically providing software changes, the method comprising:

identifying a software vulnerability of a controller, wherein:

the software vulnerability is identified based on a deviation of activity data from an allowed envelope of at least one operational attribute; and the allowed envelope is based on activity data received from a plurality of controllers;

determining a controller software change based on the identified software vulnerability, the controller software change being configured to adjust the controller from executing a first version of controller software to a second version of controller software; and sending, to the controller and based on the determining, a delta file configured to:

execute the controller software change on the controller to link execution of current code stored on the controller with execution of a segment of code from the delta file;

update a program counter of the controller to execute an instruction from the delta file without erasing existing content of a memory component of the controller; and extract code for updating memory addresses in the controller and update the memory addresses in the controller.

15. The method of claim 14, wherein the linked execution of the current code and the segment of code from the delta file form a functional equivalent of a software update that is functioning prior to rebooting the controller.

16. The method of claim 14 further comprising:

comparing attributes of the first version of controller software to attributes of the second version of controller software to determine differences between the first version of controller software and the second version of controller software; and generating the delta file representing the determined differences.

17. The method of claim 14, further comprising determining the first version of controller software by examining a record of a software version previously deployed to the controller.

18. The method of claim 17, wherein the at least one operational attribute is associated with processor activity or memory contents.

* * * * *